US006986141B1

(12) United States Patent
Diepstraten et al.

(10) Patent No.: US 6,986,141 B1
(45) Date of Patent: Jan. 10, 2006

(54) CONTEXT CONTROLLER HAVING INSTRUCTION-BASED TIME SLICE TASK SWITCHING CAPABILITY AND PROCESSOR EMPLOYING THE SAME

(75) Inventors: Wilhelmus J. M. Diepstraten, Haghorst (NL); Michael A. Fischer, San Antonio, TX (US); Wesley D. Hardell, San Antonio, TX (US)

(73) Assignee: Agere Systems Inc., Allentown, PA (US)

( * ) Notice: Subject to any disclaimer, the term of this patent is extended or adjusted under 35 U.S.C. 154(b) by 799 days.

(21) Appl. No.: 09/213,970

(22) Filed: Dec. 17, 1998

Related U.S. Application Data

(60) Provisional application No. 60/077,469, filed on Mar. 10, 1998.

(51) Int. Cl.
*G06F 4/46* (2006.01)
*G06F 15/00* (2006.01)

(52) U.S. Cl. ....................................... 718/108; 712/228

(58) Field of Classification Search ................ 709/107, 709/108, 106; 712/229, 228; 710/262, 269; 718/107, 106, 108

See application file for complete search history.

(56) References Cited

U.S. PATENT DOCUMENTS

| | | | | |
|---|---|---|---|---|
| 5,239,652 A * | 8/1993 | Seibert et al. | .............. | 713/323 |
| 5,528,513 A * | 6/1996 | Vaitzblit et al. | ............ | 709/103 |
| 5,713,038 A * | 1/1998 | Motomura | ................... | 712/41 |
| 5,761,522 A * | 6/1998 | Hisanaga et al. | .............. | 712/1 |
| 5,799,182 A * | 8/1998 | Gravenstein et al. | ....... | 712/245 |
| 6,009,454 A * | 12/1999 | Dummermuth | ............. | 709/108 |
| 6,085,218 A * | 7/2000 | Carmon | ...................... | 709/107 |
| 6,295,600 B1 * | 9/2001 | Parady | ...................... | 712/228 |

OTHER PUBLICATIONS

"Computer Architecture" by Caxton C. Foster: from Computer Science Series: 1970: pp. 175-177.
"Honeywell 800" disclosure by Mark Smotherman of Honeywall: 1958: pp. 1-5.

* cited by examiner

*Primary Examiner*—Larry D. Donaghue

(57) ABSTRACT

A context controller for managing multitasking in a processor and a method of operating the same. In one embodiment, the context controller includes: (1) a time slice instruction counter that counts a number of instructions executed with respect to a given background task and (2) a background task controller that cyclicly executes a context corresponding to another background task when the number of instructions executed equals a dynamically-programmable time slice value.

22 Claims, 21 Drawing Sheets

*FIG. 4A* system IO_Controller ~100 1(1)

102

```
/* BitString8 & 16 based on Bit_String from Z.105 */
syntype Cgroup = Integer constants 0:3 endsyntype;
syntype Cond = Integer constants 0:31 endsyntype;
syntype CtxNum = Integer constants 0:7 endsyntype;
syntype EventNum = Integer constants 0:7 endsyntype ;
syntype InstAddr = Integer constants 0:65535 endsyntype;
syntype Instruction = BitString16 endsyntype ;
syntype Offset = Integer constants -128:127 endsyntype;
syntype Vbase = Integer constants 0:1023 endsyntype;
/* Exported from Context_Controller */
remote asleep, csw, idle Boolean nodelay ;
remote context CtxNum nodelay ; /* running context */
remote events BitString8 nodelay ; /* C-group 01 */
remote nctx CtxNum nodelay ; /* next context */
remote mask BitString8 nodelay ; /* Event Mask reg */
/* Exported from Data_Path_and_Interface_Resources */
remote slice Natural nodelay ; /* inst cycles per bg slice */
remote ien Boolean nodelay ; /* true for execute cycles */
```

104

```
signal
  AckEv(CtxNum,EventNum),
  AckInst(EventNum),
  BcInst(Cond,Offset), ClearCy(CtxNum),
  ClearFG, CSaddr(InstAddr),
  CSdata(Instruction), CsLoad(CtxNum),
  CsStore(CtxNum),
  Event(CtxNum,EventNum),
  ExtEvent(CtxNum,EventNum), HfOsc,
  HwReset, InitInst(CtxNum),
  InitSeq(CtxNum), LfOsc,
  LoadMask(BitString8), Mr, Mf,
  Qr, Qf, Reset, SetCy(CtxNum),
  SetFG, SignalInst(CtxNum,EventNum),
  SkpInst(Cgroup,BitString8), Sleep,
  VecInst(Vbase), Wait, Wake ;
```

TO FIG. 4B

FIG. 7A1
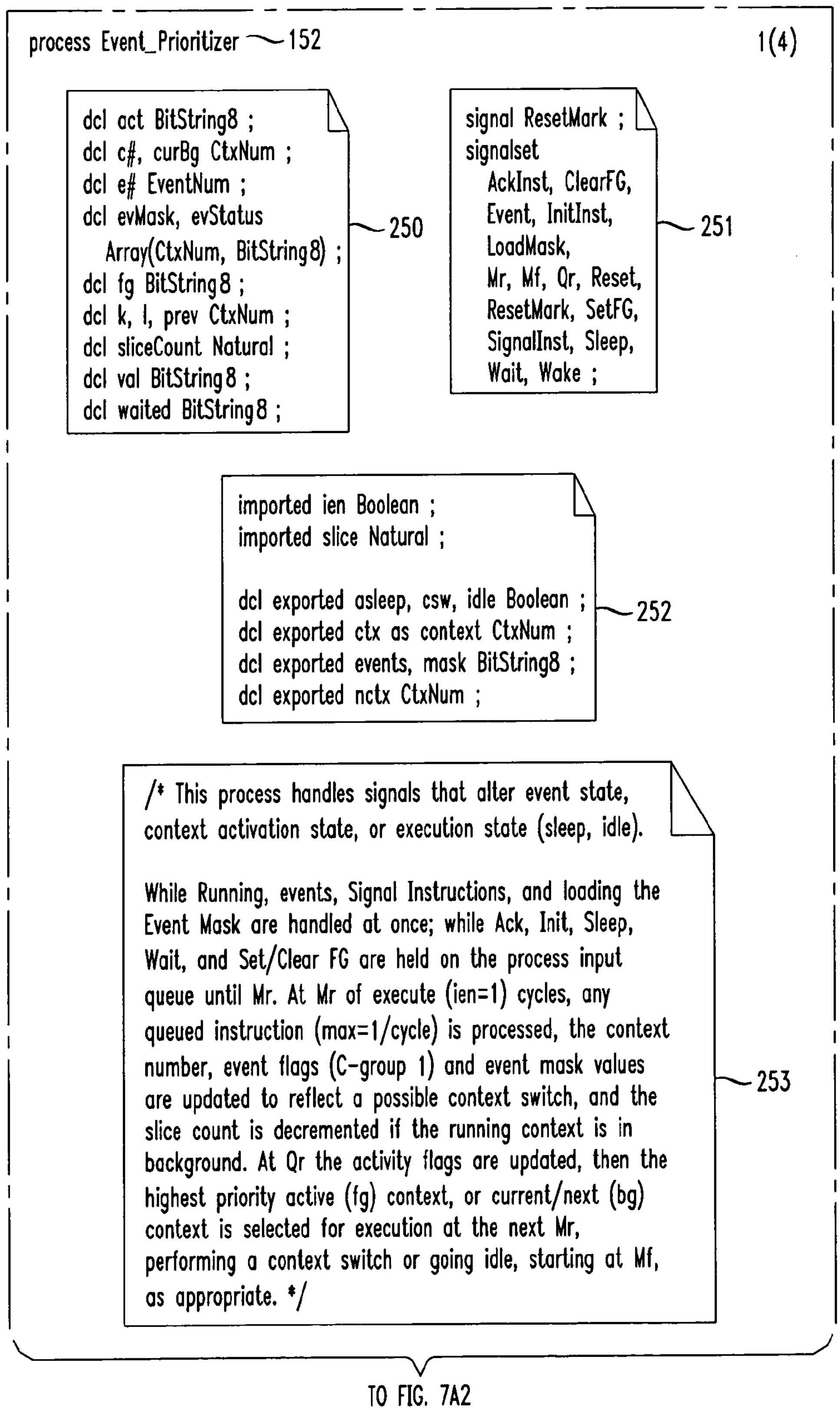
TO FIG. 7A2

FIG. 7A2
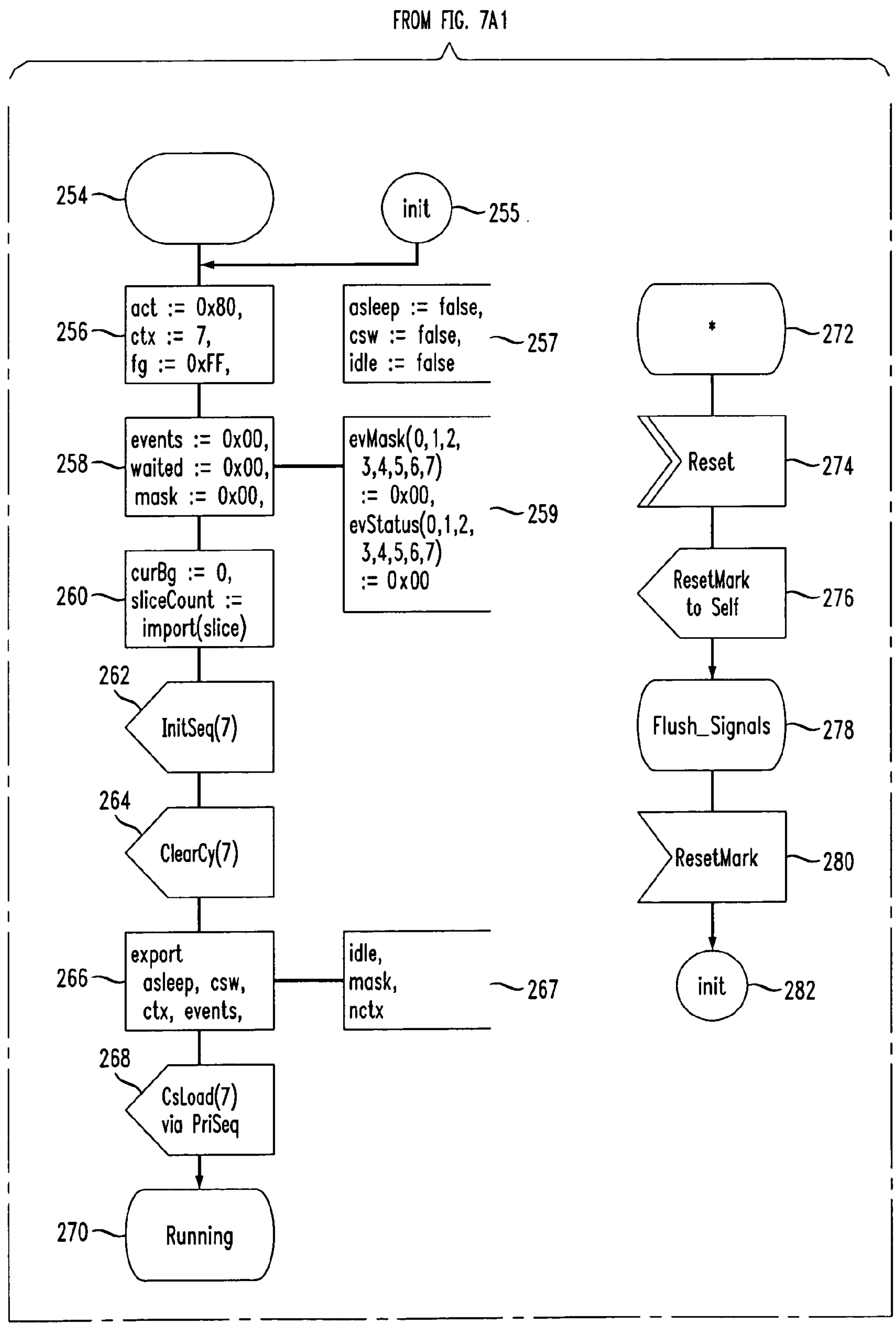

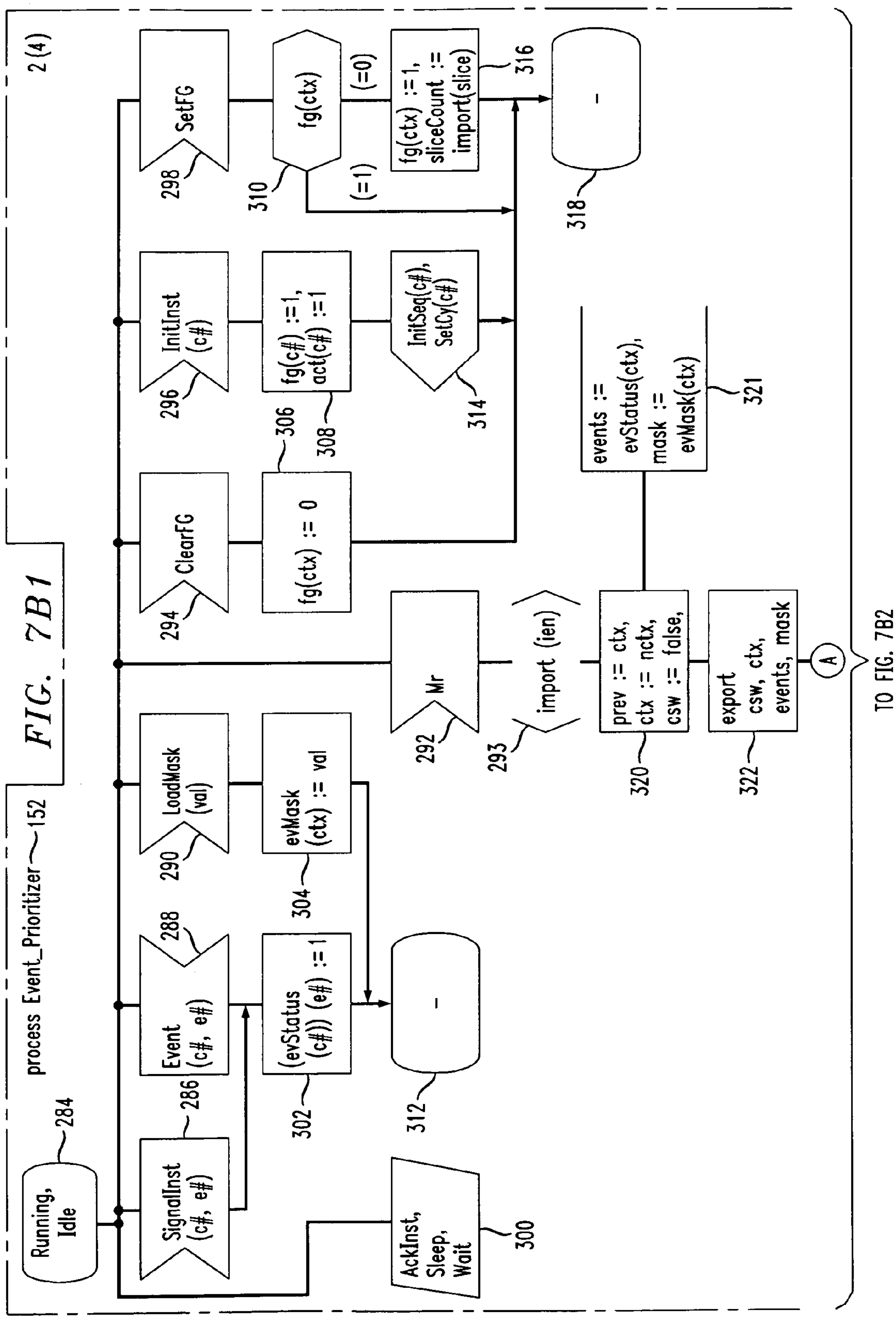
FIG. 7B1

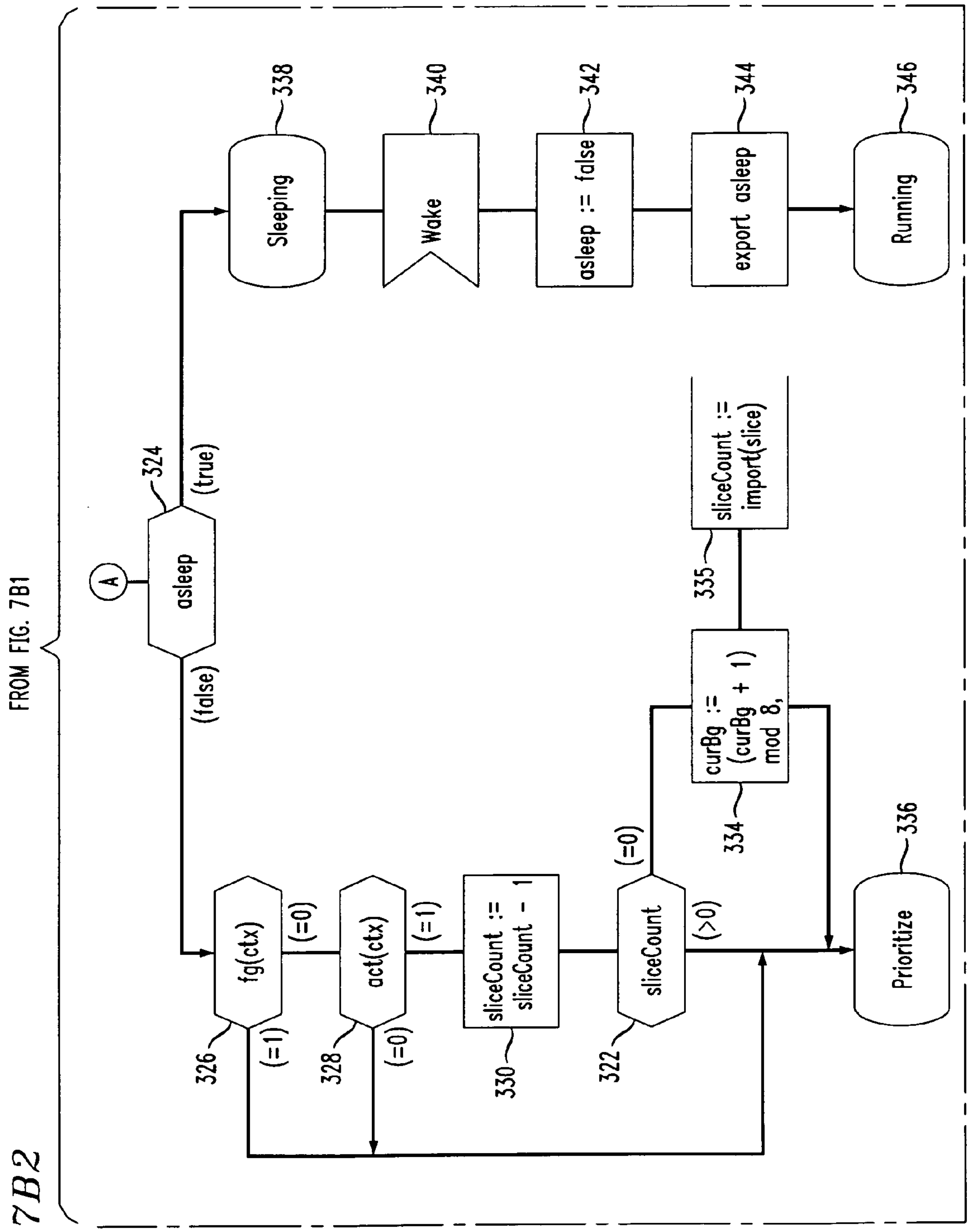
*FIG. 7B2*

*FIG. 7D1*
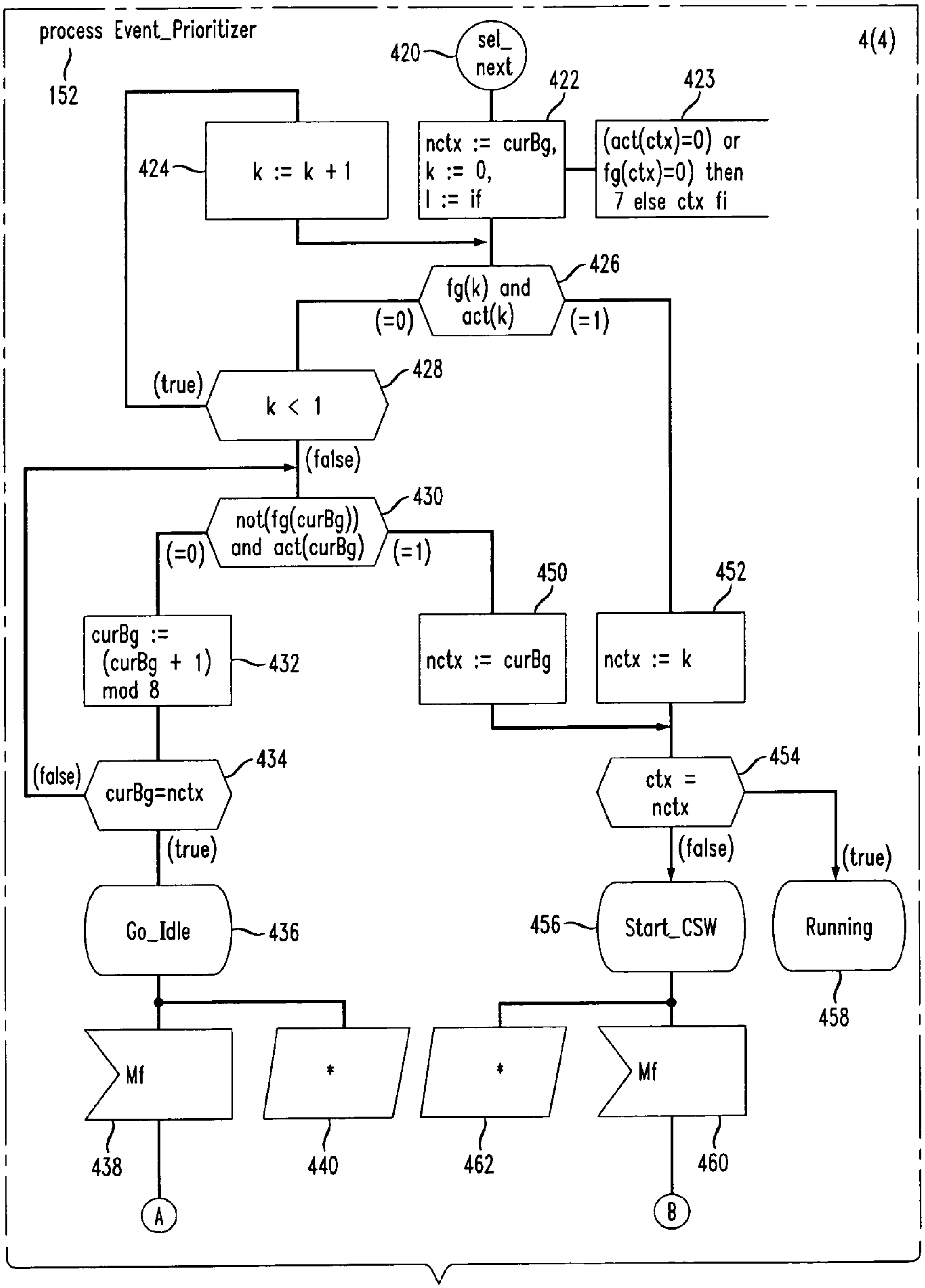
TO FIG. 7D2

*FIG. 7D2*
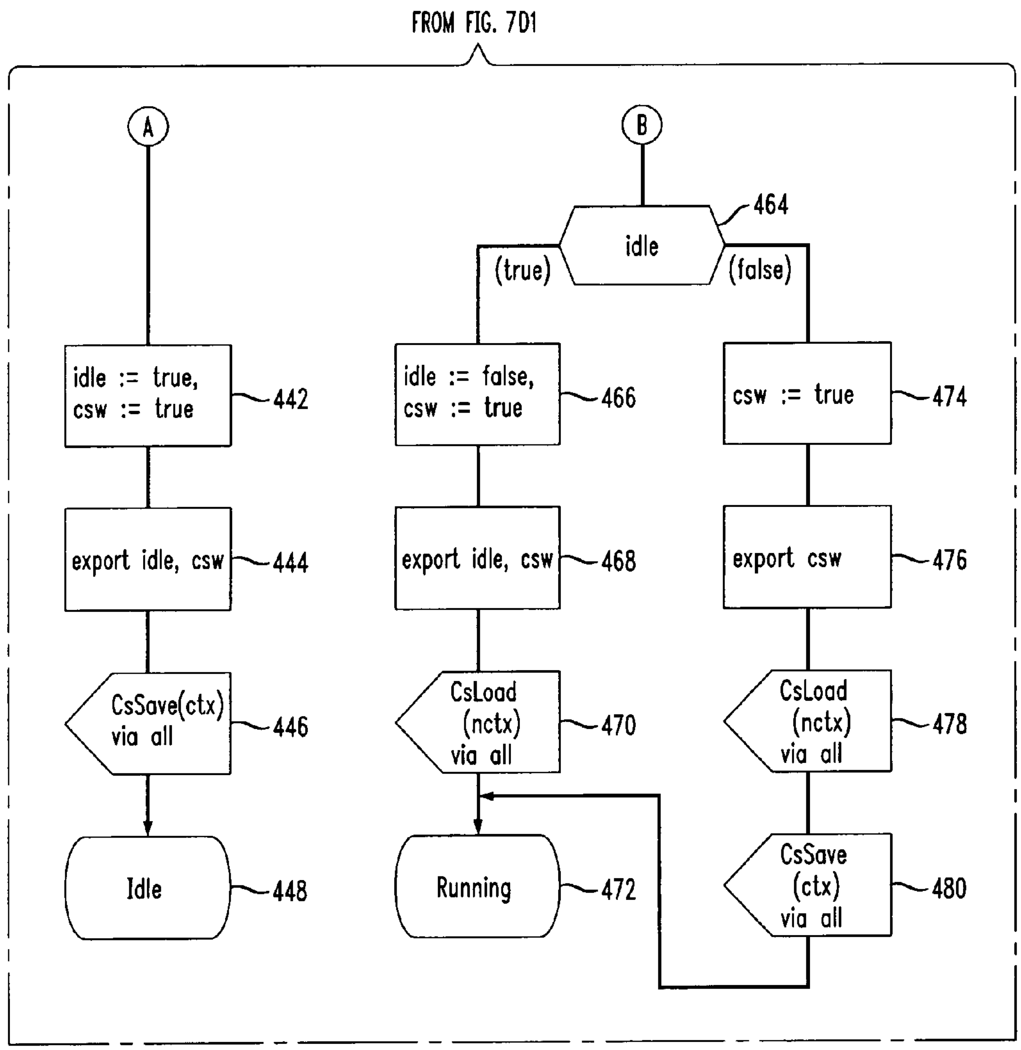

CONTEXT CONTROLLER HAVING INSTRUCTION-BASED TIME SLICE TASK SWITCHING CAPABILITY AND PROCESSOR EMPLOYING THE SAME

CROSS-REFERENCE TO RELATED APPLICATIONS

CROSS-REFERENCE TO RELATED APPLICATIONS

| Ser. No. | Title | Inventor(s) | Filing Date |
|---|---|---|---|
| 60/077,454 | Event-driven And Cyclic Context Controller And Processor Employing The Same | Diepstraten, et al. | Mar. 10, 1998 |
| 60/077,461 | Context Controller Having Status-based Background Task Resource Allocation Capability and Processor Employing the Same | Diepstraten, et al. | Mar. 10, 1998 |
| 60/077,384 | Context Controller Having Automatic Entry to Power Saving Mode and Processor Employing the Same | Diepstraten, et al. | Mar. 10, 1998 |
| 60/077,406 | Context Controller Having Context-specific Event Selection Mechanism and Processor Employing the Same | Diepstraten, et al. | Mar. 10, 1998 |
| 60/077,575 | Context Controller Having Event-Dependent Vector Selection and Processor Employing the Same | Diepstraten, et al. | Mar. 10, 1998 |

The above-listed applications are commonly assigned with the present invention and are incorporated herein by reference as if reproduced herein in their entirety.

This application also claims the benefit of U.S. Provisional Application Ser. No. 60/077,469, filed on Mar. 10, 1998, and entitled "Context Controller Having Instruction-based Time Slice Task Switching Capability And Processor Employing The Same," commonly assigned with the present invention and incorporated herein by reference.

TECHNICAL FIELD OF THE INVENTION

The present invention is directed, in general, to computer processors and, more specifically, to a context controller having instruction-based time slice task switching capability and processor employing the context controller.

BACKGROUND OF THE INVENTION

The processors in general-purpose computers, as well as those used as embedded controllers, are typically programmed to handle a plurality of tasks concurrently. A subset of these tasks must be performed in a timely manner, in response to specific, exogenous events, while the remainder of these tasks can be performed without stringent, real-time constraints. To handle both sets of tasks using a single data path, these processors require an efficient mechanism for responding rapidly to exogenous events, while allowing non-real time processing to occur whenever no exogenous events are being handled.

The predominant mechanism for event response is program interruption, which was first used in the mid-1950s. For the past 40 years, the vast majority of processor architectures have included a program interruption facility that suspends the execution of a "background" task, and initiates the execution of a "foreground" task, upon occurrence of the exogenous event(s). Each program interruption, typically called an "interrupt," causes a reversible change to the execution state of the processor upon assertion (suitably synchronized to the processor's instruction flow) of an appropriate event.

The priority interrupt, developed in the late-1950s, is a common enhancement to a program interruption facility. In a processor supporting priority interrupts, discrete priorities are assigned, either statically or dynamically, to a plurality of event (interrupt request) signals. Associated with each of these signals is a uniquely identifiable resultant state for the reversible change in execution state of the processor. Each occurrence of a priority interrupt selects the resultant state associated with the highest priority interrupt request asserted at the time when the interrupt state change is initiated.

The fundamental action when performing a reversible change in the program execution state of a processor is to save the interrupted program's execution address (and implicit inter-instruction status, such as condition codes), and to commence interrupt processing at a program address associated with the event causing the interruption. This program address is generally obtained from a predetermined memory location known as an interrupt vector. At the end of the interrupt handling routine, the saved execution address (and status value, if any) are restored, permitting execution of the interrupted program to resume at the point of interruption. In most interrupt handling routines, it is necessary to save, and subsequently to restore, additional processor state to perform the operations necessary to respond to the interrupt. This additional state is primarily the contents of processor registers other than the program counter.

Saving and restoring these registers to/from a stack or dedicated block of memory can consume considerable amounts of time. Therefore, as integrated circuits began reducing the cost and size of hardware registers in the mid-1960s, some processors were equipped with multiple sets of registers. Selection of a different set of registers, either by the interrupt support hardware or by the interrupt handling software, allowed substantially faster interrupt response by eliminating the overhead of saving and restoring registers to/from main memory.

The multiple register set concept reached its modern form on the IBM System/7, introduced in 1970. The System/7 had a dedicated, hardware-selected register set for each interrupt level, and reduced interrupt context switching time still further by including in each set a register to save the execution address (program counter value) when the level was preempted by an interrupt on a higher priority level. The result was an interrupt context switch time of 800 ns and an interrupt return time of 400 ns, both of which were truly exceptional speeds for a 16-bit minicomputer built using 1969 technology. The System/7 also pioneered dynamic interrupt assignment, where the priority level used by each interrupt source was set by software, and could be changed during system operation.

The ultimate generalization of this register set plus program counter technique was to allow events to initiate handling routines at their last execution address, rather than requiring them always to start using an interrupt vector address. For controlling I/O devices, data communication and network protocols, and other processes defined in terms of communicating state machines, this was a major benefit, because a state machine could be implemented using the level's program counter both for instruction addressing and as the (implicit) state register. This not only eliminated the need for a separate state register, but also eliminated the overhead of a dispatch routine to select the appropriate handling routine based on the value in the state register. In effect, the register set plus program counter architecture provides direct hardware support for the "task" or "execution thread" concepts commonly supported by operating system software.

The first machine developed with the intent to implement I/O control state machines using this technique was the "Alto" experimental personal computer, designed in 1972 by Charles Thacker at the Xerox Palo Alto Research Center. Since the early-1970's many variations of these interrupt and context switching mechanisms have been developed for single-chip microcomputers and microprocessors. However, none of these variations have introduced a fundamentally new mechanism for rapid context switching in response to exogenous events.

In high-performance systems it is often possible to dedicate (one or more) processors for I/O control and/or external event handling. However, if implemented with similar technology to that used in the central processor(s) of the system, the utilization of these I/O processors tends to be very low. This is due to the fact that, for any particular circuit technology, the logic devices used to implement processor data paths operate significantly faster than the storage devices used to implement main memory, and both the logic and memory devices can support higher data bandwidths than any of the attached peripheral devices.

During the 1960s, the architects of high-performance systems that required multiple I/O controllers developed a technique to share a single data path among a plurality of controller functions, even though those functions are logically disjoint. The technique used a single physical data path and instruction decoder to process, on a round-robin basis, the instruction streams of a plurality of logical processors. The only dedicated resource for each logical processor was the storage to hold its execution state (program counter and register values). The control circuitry allowed execution of a predetermined number of instructions (generally 1) for each logical processor on a sequential, cyclic basis. This control circuitry changed which one of the stored execution states was accessible to the data path between the instruction cycles for different logical processors. This technique was first used by Seymour Cray in the early 1960s to implement 10 I/O controllers (called peripheral processors or "PPUs") using a single, shared data path on the Control Data Corporation (CDC) model 6600.

Note that this logical processor state switching occurred on a strict time basis, and not in response to external events. Indeed, some successors to the Control Data 6600 PPUs implemented a priority interrupt scheme on their logical processors. More recently this data path sharing technique has been applied to central processors, where it is called "shared resource multiprocessing." In this case a plurality of independent instruction streams, from different CPU tasks or programs, are interleaved to decrease pipeline dependencies, thereby improving resource utilization, of a superscalar data path.

Accordingly, what is needed in the art is a way to configure, allocate and manage contexts that has a more general flexibility.

SUMMARY OF THE INVENTION

To address the above-discussed deficiencies of the prior art, the present invention provides a context controller for managing multitasking in a processor and a method of operating the same. In one embodiment, the context controller includes: (1) a time slice instruction counter that counts a number of instructions executed with respect to a given background task and (2) a background task controller that cyclicly executes a context corresponding to another background task when the number of instructions executed equals a dynamically-programmable time slice value.

The present invention therefore introduces the broad concept of providing variable instruction-based time slice (which may be thought of as "instruction slice") multitasking in which the time slice value (the number of instructions to be executed with respect to each background task in its allotted time slice) remains fully programmable during execution of the background tasks. In fact, "dynamically-programmable" is defined, for purposes of the present invention, as being programmable subsequent to system initialization. "Context," for purposes of the present invention, is defined as all processor state information (or any subset thereof, and such as register values) that would be of use in restoring the processor to a given state.

In one embodiment of the present invention, the time slice instruction counter initially contains the dynamically-programmable time slice value as a time slice for the given background task begins, the time slice instruction counter decrementing as the instructions with respect to the given background task are executed. Alternatively, the time slice instruction counter can be initialized to a different value and caused to count toward the dynamically-programmable time slice value. When the value contained in the time slice instruction counter reaches zero in the first case, or equals the dynamically-programmable time slice value in the second case, the background task controller can be signaled to switch to another background context.

In one embodiment of the present invention, the context controller places the processor in an idle state when all of the background tasks are inactive. In an embodiment to be illustrated and described, the processor remains ready to act on the occurrence of an event during the idle state.

In one embodiment of the present invention, the background task controller is adapted to activate a context corresponding to a particular foreground task by vectoring to a software-selectable memory location. By allowing the entry point of the particular foreground task to vary, a state machine can be established in which the initial execution address for the context activation also serves as the state indicator, allowing the foreground task to execute as a function of the event that brought about its execution. Of course, the same state machine process can take place with respect to activation of background tasks.

In one embodiment of the present invention, the processor further includes a foreground task controller that activates contexts corresponding to foreground tasks based on priority and in response to events, the background task controller cyclicly activating contexts corresponding to the background tasks subject to activation of the contexts corresponding to the foreground tasks. An "event" is defined as a stimulus capable of causing the context controller to respond by switching from one foreground task to another. Thus, tasks may be divided into foreground and background tasks and allocated processor resources using substantially different criteria. Of course, foreground tasks may also be handled on a time slice basis, perhaps in terms of instruction count.

In one embodiment of the present invention, the dynamically-programmable time slice value is contained in a register of the processor. Alternatively, the dynamically-programmable time slice value may be contained in a memory location external to the processor, at the expense of processing speed.

In one embodiment of the present invention, application tasks executing on the processor can program the dynamically-programmable time slice value. Alternatively, programming of the dynamically-programmable time slice value may be limited to only the operating system, if security of the time slice value is a priority.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIGS. 7A, 7B, 7C and 7D collectively illustrate process diagrams of the event prioritization process illustrated in FIG. 5;

DETAILED DESCRIPTION

Figure 1:
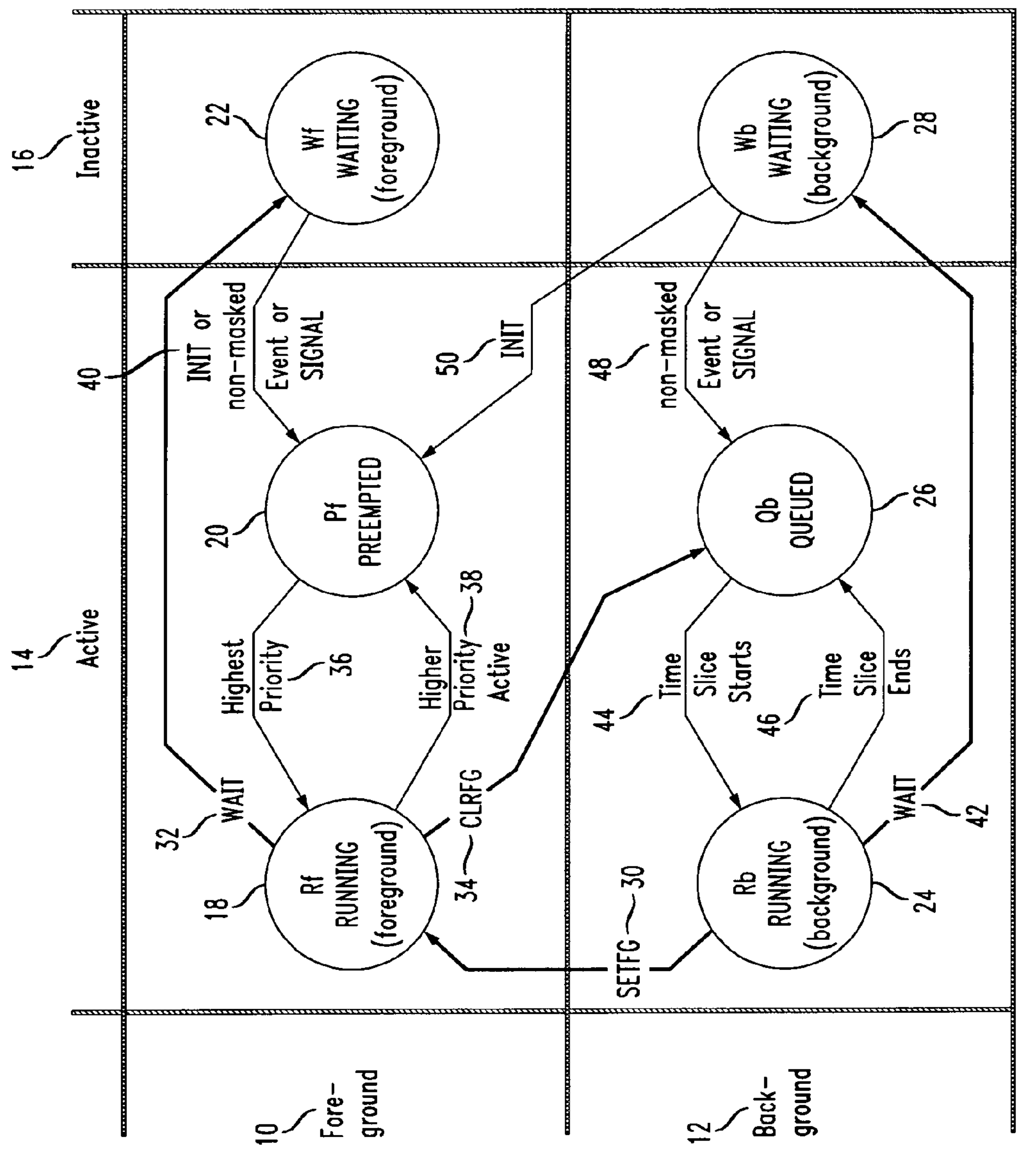
FIG. 1 illustrates a state transition diagram showing operation of one embodiment of a processor of the present invention from the point of view of an individual context.

Referring initially to FIG. 1, illustrated is a state transition diagram showing operation of one embodiment of a processor of the present invention from the point of view of an individual context. The present invention provides for use of a context controller for managing multitasking in a processor and introduces the concept of dividing tasks into foreground and background tasks and allocating processor resources using substantially different criteria.

Events (stimuli capable of causing a foreground context switching action) are employed to determine which foreground tasks are activated, with execution of active, foreground tasks based on predefined priority levels. In contrast, background tasks are executed cyclicly with the background tasks subject to activation of the contexts corresponding to the foreground tasks. Also, background task execution may be based on time slice, instruction slice or any other cyclic allocation. Of course, foreground tasks may also be handled on a time slice basis, perhaps in terms of instruction count.

The context controller may include a time slice instruction counter that counts a number of instructions executed with respect to a given background task and a background task controller that cyclicly switches to a context corresponding to another background task when the number equals a dynamically-programmable time slice value.

At any given time that the processor is operating, each context is in one of six states, which are logically grouped into four sets as a two rows by two columns (2×2) matrix. The top or foreground row 10 contains three states: an Rf state 18, a Pf state 20 and a Wf state 22 (where each includes an "f" to indicate foreground) used by foreground contexts. The bottom or background row 12 contains three states: an Rb state 24, a Qb state 26 and a Wb state 28 (where each includes a "b" to indicate background) used by background contexts. The active column 14 contains the four states 18, 20, 24, 26 used by the active contexts, while the inactive column 16 contains the two states 22 and 26 used by the inactive contexts, respectively.

The foreground row 10 states may be further defined as Rf 18 running, foreground), Pf 20 (preempted, foreground) and Wf 22 (waiting, foreground). The background row 12 states may be further defined as Rb 24 (running, background), Qb 26 (queued, background) and Wb 28 (waiting, background). During each instruction cycle, only one context may be "running" (executing an instruction on the processor), or the processor alternatively may be idle. If occupied, the running context is the sole context in the foreground running state Rf. Or if the state Rf 18 is unoccupied, the running context is the sole context in the background running state Rb 24 (if occupied). The execution states of contexts are generally stored in separate register sets.

Most context transitions are allowed to take place within either the foreground row 10 or the background row 12, because inter-row transitions are only needed when a context switches between foreground and background operating tasks which may be distinguished by a software switch operation. However, this occurs less frequently than context activation, preemption and waiting. Transitions from foreground to background may only occur when the running foreground context Rf 18 executes a CLRFG ("clear foreground") function 34, which results in a transition from the foreground running state Rf 18 to the background queued state Qb 26. Because there are no relative priority distinctions among background contexts, the position in the background queue given to the context executing the CLRFG function 34 is arbitrary.

A context executing a CLRFG function 34 is leaving foreground operation and advantageously relinquishes control of the processor for a minimum of one instruction cycle (as does a context executing a WAIT function 32 or 42). If a lower priority foreground context is in the preempted state Pf 20, that lower priority foreground context runs next (via a HIGHEST PRIORITY transition 36). If the preempted state Pf 20 is unoccupied, a preempted context already in the background state Rb 24 runs next, unless the background state Rb 24 is also unoccupied. In this case, the context at the head of the background queue in the background queued state Qb 26 runs next, via a TIME SLICE starts transition 44. In the illustrated embodiment, this occurs after a single instruction cycle with the processor idle, since both the foreground running state Rf 18 and the background running state Rb 24 are unoccupied.

This embodiment of the present invention introduces the broad concept of providing instruction-based time slice, which may be thought of as instruction slice, multitasking in which the time slice value (that is, the number of instructions to be executed with respect to each background task in its allocated time slot) remains fully programmable during execution of the background tasks. Recall that dynamically programmable is defined, for purposes of the present invention, as being programmable subsequent to system initialization.

A transition between background and foreground normally occurs when a context in background running state Rb 24 executes a SETFG ("set foreground") function 30, which results in its transition from the background running state Rb 24 to the foreground running state Rf 18. Foreground activation of a particular context may also occur by vectoring to a software-selectable memory location. By allowing the entry point of the particular foreground task to vary, a state machine can be established, allowing the foreground task to execute as a function of the event that brought about its execution. Of course, the same state machine process can take place with respect to activation of background tasks.

To prevent erroneous disruption of context operation, the functions available in the context controller advantageously do not include a mechanism by which a running context can change the foreground or background setting of any other context without also forcing an initialization (INIT) of that context. The INIT function may be executed by the running context with any other context as the target. An INIT function can be executed to the running context, but no reason exists to do so unless a particular embodiment attached additional initialization side effects to the INIT function. Execution of an INIT function leaves the target context in the foreground preempted state Pf 20 with its program counter set to a predetermined initialization vector address, as will be discussed in greater detail below.

Normally, the target of an INIT function resides in the foreground wait state Wf 22 and enters the foreground preempted state Pf 20 via a transition 40. Or, it may reside in the background wait state Wb 28 and enter the foreground preempted state Pf 20, switching from background to foreground via a transition 50. In fact, the transition 50 is also possible and equivalent, if the target context resides in either the background running state Rb 24 or the background queued state Qb 26, but FIG. 1 does not illustrate these two cases.

At the end of a processor reset, all contexts are in the foreground wait state Wf 22, except the lowest-priority context, which is in the foreground running state Rf 18. Software executing on the context foreground running state Rf 18 may initiate a transition to the context foreground waiting state Wf 22 by executing a WAIT function 32. A foreground waiting state Wf 22 context transitions to the foreground preempted state Pf 20 with an assertion of any of that context's activation events that are enabled by the context's event mask or when the running context executes an INIT function to this context foreground preempted state Pf 20 via the transition 40.

In the illustrated embodiment, a preemption context switch occurs at the end of every instruction cycle, with the highest priority context in the foreground preempted state Pf 20, if any, entering the foreground running state Rf 18 via the HIGHEST PRIORITY transition 36, and the previous context in the foreground running state Rf 18, if any, entering the foreground preempted state Pf 20 via a HIGHER PRIORITY ACTIVE transition 38.

Software executing in the context background running state Rb 24 may initiate a transition to the background waiting state Wb 28 by executing a WAIT function 42. A context in the background waiting state Wb 28 transitions to the background queued state Qb 26 with the assertion of any of that context's activation events that are enabled by the context's event mask. Transitions from the background queued state Qb 26 to the background running state Rb 24 may only occur when no foreground context is running (no context in state Rf 18). In this case, the running context if any, is in the background running state Rb 24, or the processor is in an idle state because no context is ready to run in either foreground or background.

At the end of every instruction cycle, with the context running in the background state Rb 24, the time slice count is decremented, and on the instruction cycle when the count reaches zero, a time slice context switch preferably occurs. At this point, the context at the head of the background queue enters the background running state Rb 24 via the transition 44, and the context previously in the background running state Rb 24 enters the background queued state Qb 26 via the transition 46.

Generally, the background queued contexts are organized in a first-in, first-out (FIFO) arrangement with "wrap-around" occurring from the highest context number to the lowest context number when a previously-running background context enters the background queued state Qb 26. It should be noted that foreground preemption involves a state transition via the transition 36, whereas background preemption by foreground does not. In this case, the previously-running background context remains in the state Rb 24 until the foreground running state Rf 18 is again unoccupied and a background context is able to run.

Figure 2:
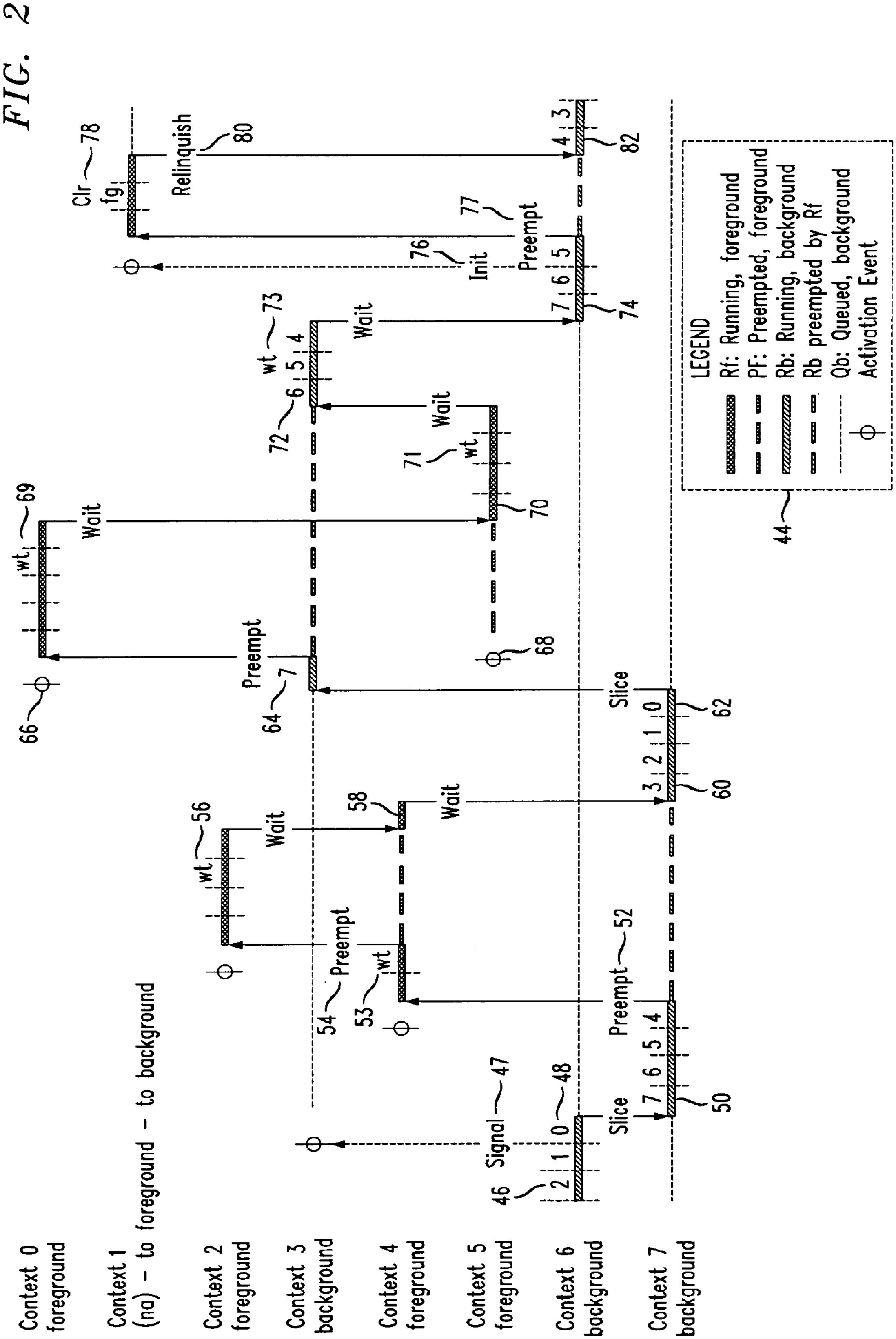
FIG. 2 illustrates a diagram exemplifying possible processing flow, preemption, and inter-context communication on a processor operating with five foreground contexts and three background contexts.

Turning now to FIG. 2, illustrated is a diagram exemplifying possible processing flow, preemption and inter-context communication on a processor operating with five foreground contexts and three background contexts. A context may be activated by the assertion of an event signal.

Associated with each context may be zero or more exogenous event signals and zero or more endogenous event signals. The principal difference between exogenous and endogenous event signals is that exogenous signals are advantageously synchronized to the processor's clock before being used for context activation decisions within the context controller. In contrast, endogenous signals are assumed to be generated in synchronism with the processor's clock and are used directly.

Each of the context's activation events may be enabled and disabled under software control by setting and clearing bits in a context-specific event mask register. In addition to assertion of activation events due to the assertion of hardware signals from exogenous sources, such as external interfaces, or from endogenous sources, such as interval timers, coprocessors or data transfer logic, some or all events may be asserted by software using signal instructions that specify a target context number and event number within the set of events associated with the target context. Since any context can signal events to itself or to other contexts, this allows the illustrated embodiment to serve as an efficient mechanism for both intra-context and inter-context communication as well as serving as a priority interrupt controller and as a time slice controller.

In the diagram of FIG. 2, the vertical axis represents contexts, while the horizontal axis represents context activities for each of the eight contexts supported on the exemplary context controller. The horizontal axis is time, in units of instruction execution cycles. The wide black lines, for foreground contexts, and the wide cross-hatched lines, for background contexts, show the running context. Vertical lines with arrows show the context switches and are labeled to identify the reason that a context switch occurred. The small perpendicular lines crossing the wide lines indicate instruction cycles.

The numbers above each instruction cycle interval for background contexts are the values of the time slice instruction counter when that instruction is being executed. As stated earlier, the time slice instruction counter counts the number of instructions executed with respect to a given background task. Additionally, a background task controller that cyclicly activates a context corresponding to another background task when the number equals a dynamically-programmable time slice value may be used. The time slice instruction counter may contain the dynamically-programmed time slice value for the background task and this value decrements as the instructions are executed. Alternately, the time slice instruction counter can be initialized to a different value and caused to count toward the dynamically-programmable value.

The dynamically-programmable time slice value is contained in a register of the processor. Alternately, the dynamically-programmable time slice value may be contained in a memory location external to the processor, at the expense of processing speed. Additionally, application tasks executing on the processor can program the dynamically-programmable time slice value. Or, programming of the dynamically-programmable time slice value may be limited to only the operating system, if security of the time slice is a priority.

Continuing, the narrow dashed black lines, for foreground contexts, and narrow cross-hatched dashed lines, for background contexts, show active preempted contexts. Narrow dotted lines show active, queued background contexts. This embodiment has eight contexts, designated context 0 (the highest priority) through context 7 (the lowest priority), and during this example is operating with a time slice instruction count of eight.

At the time this example starts, contexts 0, 2, 4 and 5 are all inactive foreground contexts (state Wf). Contexts 3, 6 and 7 are all background contexts with context 3 inactive (state Wb), context 7 queued (state QB) and context 6 running (state Rb) Context 1 is inactive, and has an unknown (or indeterminate) foreground/background setting. A first instruction cycle 46 shown is executed by background context 6 as its time slice count value decrements to two. In a next instruction cycle 47, background context 6 executes a SIGNAL function to background context 3. As a result, background context 3 becomes active entering state QB on the following instruction cycle. After sending the SIGNAL function, background context 6 executes another instruction cycle 48 as its time slice count decrements to 0. This causes a context switch to the next highest context number in the active context background queued state QB, which is background context 7.

Context 6 enters the QB state and context 7 enters the Rb state at an instruction cycle 50 with a time slice count value of 7. After context 7 has executed three instructions, an exogenous event activates foreground context 4. Therefore, at the end of a next instruction cycle 52, background context 7 is preempted by foreground context 4 with its time slice count value remaining at four during the preemption.

Foreground context 4 executes its first instruction while an exogenous event activates foreground context 2. Therefore, at the end of a next instruction cycle 54, foreground context 4 is preempted by foreground context 2 (at a preemption point 53) entering the preempted state Pf while foreground context 2 enters the running state Rf. After executing two instructions to handle its activation event, foreground context 2 executes a WAIT function during a third instruction cycle 56. This WAIT function clears the activity flip-flop for foreground context 2, and after one more instruction cycle, foreground context 2 becomes inactive reverting to the waiting state Wf. This allows the preempted foreground context 4 to return to the running state Rf and execute another instruction cycle 58. Because foreground-context 4 had already executed its own WAIT function prior to the preemption point 53, this is the final instruction executed by foreground context 4 before reverting to the waiting state Wf and permitting preempted background context 7 to resume running at an instruction cycle 60. After executing four more instructions, background context 7 completes its time slice 62, resulting in a context switch to the next top QB context which is background context 3 because of a wrap-around of context numbers from context 7 to context 0.

During the same instruction cycle 64, the background context 3 executes the first instruction of its time slice 7, an exogenous event 66 activates foreground context 0. Therefore, at the end of this instruction cycle 64, background context 3 is preempted by foreground context 0 with its time slice count value remaining at seven during the preemption. After executing three instructions to handle its activation event, foreground context 0 executes a WAIT function during a fourth instruction cycle 69. This WAIT function clears the activity flip-flop for foreground context 0, and after one more instruction cycle foreground context 0 becomes inactive, reverting to the waiting state Wf. This normally allows the preempted background context 3 to resume running, but in this example an exogenous event 68 has activated foreground context 5 while foreground context 0 was running. Note that this activation changed the state of foreground context 5 from the waiting state Wf to the preempted state Pf, showing how it is possible for a foreground context to enter preempted state without having executed any instructions since activation.

If background context 3 had been operating in foreground, the fact that foreground context 5 was in the preempted state Pf when foreground context 0 reverted to the waiting state Wf would be irrelevant, since background context 3 is higher in priority than foreground context 5. However, context 3 is operating in background, so a WAIT function 69 executed by foreground context 0 results in a context switch to foreground context 5 which enters the running state Rf and begins executing an instruction 70 while background context 3 remains preempted in state Rb.

After executing two instructions to handle its activation event, foreground context 5 executes a WAIT function during a third instruction cycle 71. This WAIT function clears the activity flip-flop f or foreground context 5, and, after one more instruction cycle, context 5 becomes inactive and reverts to the waiting state Wf. Since no other foreground contexts are active at this time, preempted background context 3 resumes running in state Rb and executes the second instruction of its time slice 72. On the next instruction cycle, background context 3 executes a WAIT function 73. The WAIT function 73 clears the activity flip-flop for background context 3, and after one more instruction cycle, background context 3 becomes inactive, reverting to the waiting state Wb. This allows queued background context 6 to return to the running state Rb at an instruction cycle 74. Note that, even though this context switch was not initiated by the time slice count decrementing to zero, background context 6 enters the running state Rb at the instruction cycle 74 with a full time slice count value of seven, rather than inheriting the partial time slice remaining when the background context 3 executed the WAIT function 73.

As its second instruction, the background context 6 executes an INIT function 76 to the foreground context 1 to force the foreground context 1 into a known state as may be necessary to recover from a software error in the code executed by context 1. This INIT function activates context 1 as a foreground context preempted state Pf with execution set to begin at the context 1 initialization vector address in control store. Because an active foreground context now exists, background context 6 is preempted (at a preemption point 77) by a context switch to context 1 after execution of one more instruction. As its second instruction, context 1 executes a CLRFG (clear foreground bit) function 78 which causes context 1 to enter the background queued state Qb. Because context 1 is now on the background queue and there is already a context in state Rb, context 1 relinquishes control of the processor (at a relinquish point 80) after the instruction cycle following the execution of the CLRFG function 78, thereby allowing context 6 in state Rb to resume executing the remainder of its time slice 82.

In the remainder of this Detailed Description, numeric constants are in decimal unless preceded by "Ox" in which case they are in hexadecimal, and bit positions are numbered, with bit zero being the least-significant bit.

Figure 3:
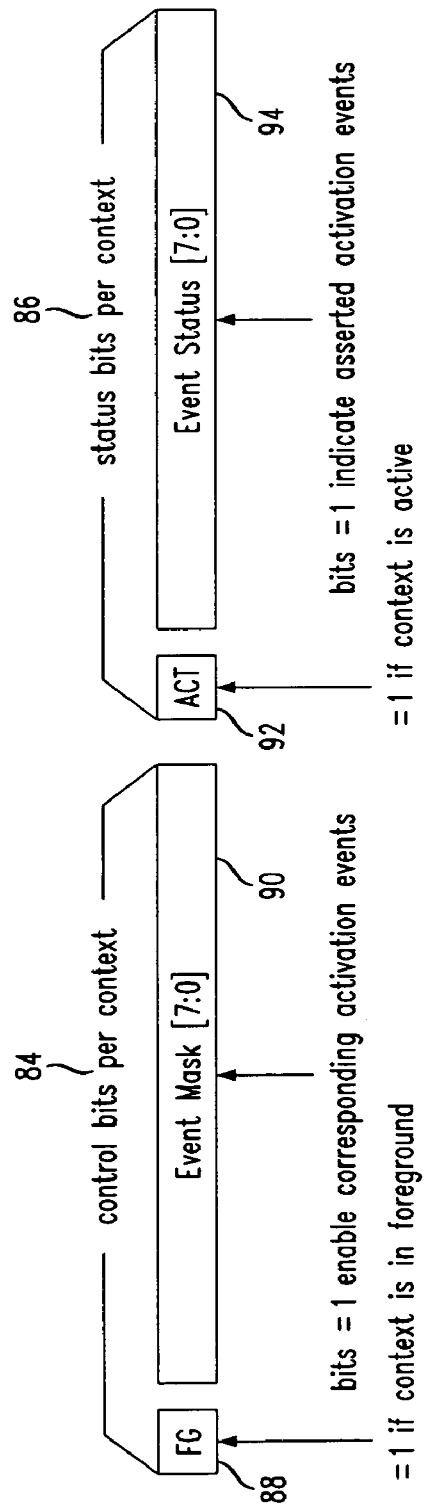
FIG. 3 illustrates exemplary per-context control and status registers accessible to software executing in a processor employing an embodiment of the present invention.

Turning now to FIG. 3, illustrated are exemplary per-context control and status registers accessible to software executing in a processor employing an embodiment of the present invention. Nine control bits per context 84 have values that are determined by software, and nine status bits per context 86 have values that are determined by context controller hardware, but whose values may be read or tested in other manners by software. The context controller maintains a portion of the state of each context. These state bits are not part of the execution state (which is saved and restored during context switching) because the context-specific state within the context controller is required continuously for use by activation logic and also as inputs to the context switching decision logic.

The per-context control bits 84 include a foreground (FG) bit 88 and an event mask register 90. The FG bit 88 is equal to one when the context is in foreground. The FG bit 88 is illustrated as being set by hardware reset execution of the INIT function with this context as the specified target, or execution of the SETFG function while this context is running. The FG bit 88 is illustrated as being cleared by execution of the CLRFG function while this context is running. The event mask register 90 has a bit corresponding to each of the activation events associated with the context.

In the illustrated embodiment, each context is allotted eight activation events; the event mask register 90 therefore contains eight bits. A given activation event can only activate a context when the corresponding bit position number which is equal to the event number has a value of one in the context event mask register 90. However, as will be explained in greater detail below, the assertion of an activation event is recorded in an event flip-flop which remains set until execution of an ACKNOWLEDGE (ACK) function for the specified bit. Setting of the event flip-flop is unaffected by the contents of the event mask register 90.

The per-context status bits 86 include an ACT bit 92 and an event status register 94. The ACT bit 92 is equal to one when the context is active. The ACT bit 92 is set by either an assertion of a non-masked activation event, a setting of the event mask bit for an asserted unacknowledged activation event or an execution of the INIT function with this context as the specified target. The ACT bit 92 is cleared by hardware reset (except for context 7, where the ACT bit is set by hardware reset), and by execution of the WAIT function while the context is running. The event status register 94 has a bit corresponding to each of the activation events associated with the context. These bits are also referred to as event flip-flops in some portions of this Detailed Description.

As stated above, in the illustrated embodiment, each context is allotted eight activation events, dictating that the event status register 94 contains at least eight bits. The bits corresponding to asserted events read are equal to one, and the bits corresponding to unasserted events read, including acknowledged events, are equal to zero. Individual event status register bits (event flip-flops) are set by context controller hardware upon detection of assertion (typically a zero-to-one transition) of an exogenous or endogenous event signal. The individual event status bits may also be set upon execution of a SIGNAL function specifying as a destination the subject event in this context. Individual event status register bits are cleared by hardware reset and by executing an ACK function with the subject event as the specified target, while this context is running. In some cases, a particular ACK function may also be generated as a side-effect of executing other instructions or accessing particular data path (typically I/O port) registers.

An implementation example which illustrates context definition and usage for an IEEE 802.11 Media Access Control (MAC) controller is presented below. The functions of a MAC controller have been divided into eight contexts, designated 0 to 7, with 0 being the highest priority. Contexts 0 to 5 are preferably foreground and 6 and 7 are preferably background. Each context has eight activation events and each of the activation events generally apply the following defaults:

A. an event may not be asserted using the SIGNAL function (unless the event is reserved for such purpose);
B. an event is cleared using the ACK function;
C. timer terminal count events occur when the corresponding timer decrements to zero;
D. timer terminal count events are cleared by writing to the corresponding timer's control register with ClearTC (bit2) equal to one, not the ACK function;
F. "assertion" of an external event signal is defined as a 0 to 1 transition;
G. "negation" of an external event signal means a 1 to 0 transition; and
H. control bit names are chosen to be meaningful when the bit is equal to one.

The exemplary contexts and their corresponding activation events are described below.

CONTEXT 0—Debug support (and high-priority, real-time events):

Activation Events:

0) hardware breakpoint (BKPTin);
1) software breakpoint (signal 0,1);
2) GP serial shift complete or UART transmitter done (GPDN/UTXDN);
3) interval timer A terminal count (INTATC);
4) UART receiver done (URXDN);
5) interval timer B count (INTBTC);
6) host (computer system) attention (HATN); and
7) coprocessor attention (CPATN).

Context 1—Lower MAC (LMAC) Exception Handling

Activation Events:

0) modem data interface attention (MDIATN);
1) physical layer data not available (!PDA);
2) IFS (inter-frame space) timer terminal count (IFSTC);
3) inter-context communication from MMAC to LMAC;
4) physical layer transmitter not ready (!TXR);
5) beacon/dwell timer comparator equal (BCNTC);
6) modem data interface programmable bit boundary (MDIBIT); and
7) modem management interface transfer complete (MMIDN).

Context 2—Lower MAC (LMAC) Data Transfers:

Activation Events:

0) modem data interface attention (MDIATN);
1) interval timer B terminal count (INTBTC);
2) IFS (inter-frame space) timer terminal count (IFSTC);
3) inter-context communication from MMAC to LMAC (signal 2,3);
4) TSFT (the synchronization function timer) wraparound (TSFWRP);
5) NAV (network allocation vector) timer terminal count (INTCTC);
6) physical layer medium busy (MBUSY); and
7) physical layer medium not busy (!MBUSY).

Context 3—Host Interface Support:

Activation Events:

0) buffer access path 0 offset resolution (BUFATN0);
1) buffer access path 1 offset resolution (BUFATN1);
2) inter-context communication for status reporting to host (signal 3,2);
3) buffer access path 0 block boundary crossing (BLKATN0);
4) buffer access path 1 block boundary crossing (BLKATN1);
5) inter-context communication for status reporting to host (signal 3,5);
6) host interface register attention (HATN); and
7) inter-context communication from background (signal 3,7).

Content 4—Middle MAC (MMAC) Medium Access and Timing:

Activation Events:

0) inter-context communication from LMAC or HMAC (signal 4,0);
1) previously-busy medium becomes available (MAVL);
2) IFS/slot timer terminal count (IFSTC);
3) interval timer A terminal count (INTATC);
4) beacon/dwell timer comparator (BCNTC);
5) modem data interface attention (MDIATN);
6) software flags 3–0 (shared with context 7, event 7); and
7) modem management interface transfer complete (MMIDI).

Context 5—WEP (wired equivalent privacy) Decryption Support:

Activation Events:

0) inter-context communication for status reporting (signal 5,0);
1) decryption keystream values ready (DECRYPT);
2) inter-context communication for status reporting to host (signal 3,2);
3) buffer access path 0 block boundary crossing (BLKATN0);
4) buffer access path 1 block boundary crossing (BLKATN1);
5) inter-context communication for status reporting to host (signal 3,5);
6) host interface register attention (HATN); and
7) inter-context communication from background (signal 3,7).

Content 4—Middle MAC (MMAC) Medium Access and Timing:

Activation Events:

0) inter-context communication from LMAC or HMAC (signal 4,0);
1) previously-busy medium becomes available (MAVL);
2) IFS/slot timer terminal count (IFSTC);
3) interval timer A terminal count (INTATC);
4) beacon/dwell timer comparator (BCNTC);
5) modem data interface attention (MDIATN);
6) software flags 3–0 (shared with context 7, event 7); and
7) modem management interface transfer complete (MMIDI).

Context 5—WEP (wired equivalent privacy) Decryption Support:

Activation Events:

0) inter-context communication for status reporting (signal 5,0);
1) decryption keystream values ready (DECRYPT);
2) GP serial shift complete or UART transmitter done (GPDN/UTXDN);
3) inter-context communication (signal 5,3);
4) UART receiver transfer done (URXDN);
5) inter-context communication (signal 5,5);
6) interval timer D terminal count (INTDTC); and
7) modem management interface transfer complete (MMIDN).

Context 6—Additional Access Point Functions:

Activation Events:

0) software flags 11–8;
1) software flags 15–12;
2) GP serial shift complete or UART transmitter done (GPDN/UTXDN);
3) interval timer A terminal count (INTATC);
4) software flags 7–4;
5) interval timer B terminal count (INTBTC);
6) interval timer D terminal count (INTDTC); and
7) coprocessor attention (CPATN).

Context 7—Upper MAC (UMAC) and Miscellaneous Support:

Activation Events:

0) software flags 19–16;
1) software flags 23–20;
2) software flags 27–24;
3) interval timer A terminal count (INTATC);
4) beacon/dwell timer comparator (BCNTC);
5) interval timer B terminal count (INTBTC);
6) interval timer D terminal count (INTDTC); and
7) software flags 3–0 (shared with context 4, event 6).

Figure 4B:
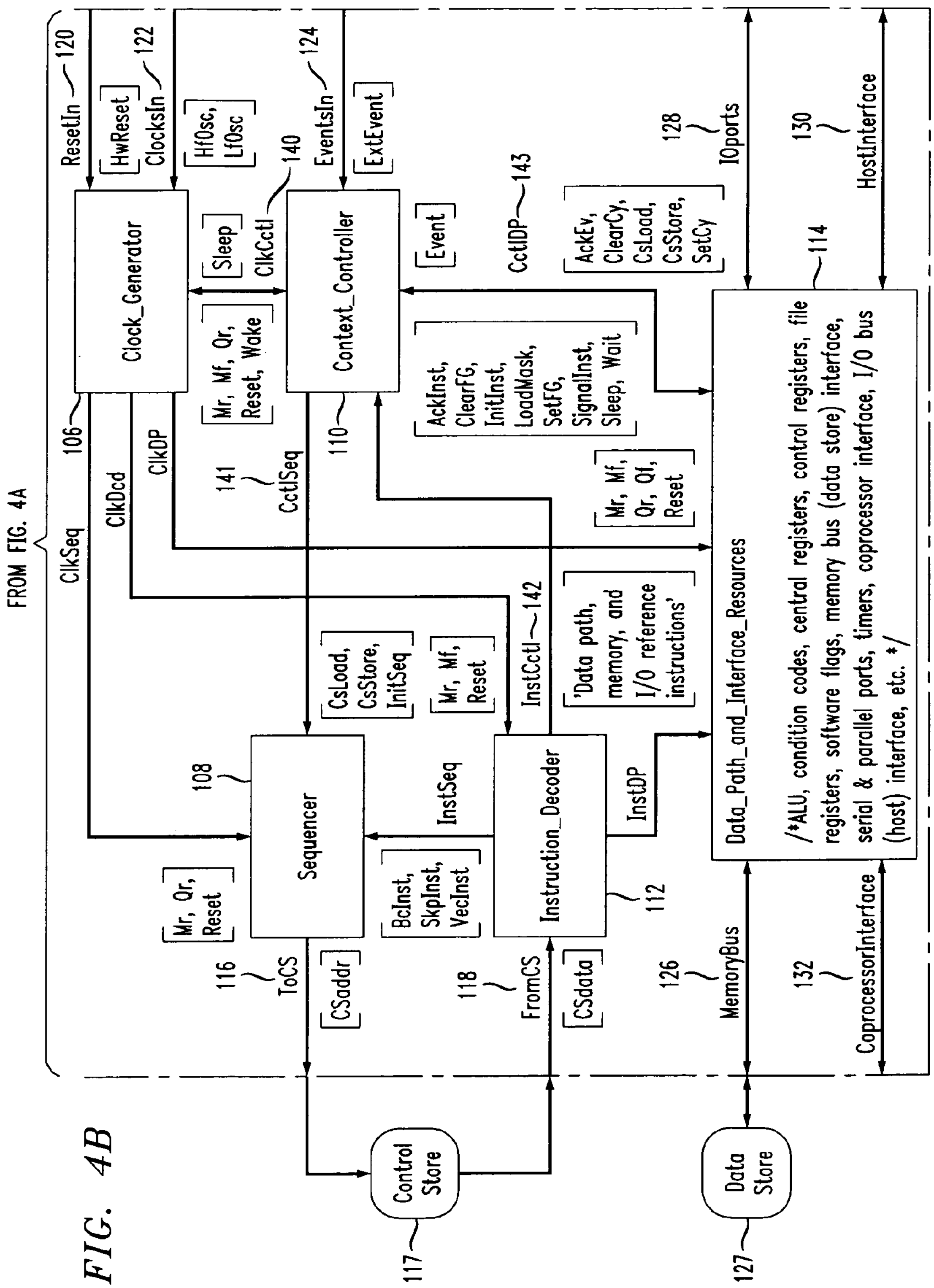
FIG. 4 illustrates a system diagram of a typical processor or I/O controller incorporating an embodiment of the context controller of the present invention.

Turning now to FIG. 4, illustrated is a system diagram of a typical processor or I/O controller incorporating an embodiment of the context controller of the present invention. This diagram (as well as those illustrated in FIGS. 5, 6 and 7) is presented using the well-known graphical syntax of the Specification and Description Language (SDL) as standardized by the International Telecommunication Union in ITU-T Recommendation Z.100 (03/93).

The system behavior is presented using this formal description language because more precision and broader general applicability are achievable. For example, a schematic fragment could be used to highlight implementation characteristics of the illustrated embodiment. However, since this context controller is applicable to almost any type of processor, the schematic for a particular processor is likely to omit aspects of the control sequences which are implicit for that processor but may be relevant to another processor using a different architecture. Also, a conventional state diagram is a more informal notation having a similar objective to the SDL process diagram. SDL has a rigorously defined graphical syntax, however, achieving much less ambiguity. Indeed, it has been found that many "boundary conditions" in the behavior of this controller are not adequately explained by conventional state diagrams. Examples of these boundary conditions, all of which are covered by the SDL description herein, include: (1) What happens if a context is preempted between execution of a WAIT function and execution of the instruction following the WAIT function? (2) What happens if a context executes the ACK function for the event which caused its activation during the instruction after executing a WAIT function? and (3) If a background context's time slice ends on the same instruction cycle as it executes a SETFG function, does that context continue running in foreground, or does the next context in state Qb execute one instruction before being preempted by the new foreground context? Also, SDL is able to describe the behavior of the context controller with more precision and less ambiguity than is possible using English prose. Therefore, the SDL descriptions presented in the following paragraphs are intended to serve as both a general and a detailed guide to the structure and intended purpose of the significant features of several embodiments of this invention.

An SDL system diagram 100 shows the relevant top-level functional blocks of the processor used in the illustrated embodiment. Text symbols 102 and 104 contain the definitions of the system-specific extensions to SDL's predefined data types, declarations of the remote variables used for implicit inter-block communication via the export/import mechanism and declarations of the names and parameter types of the signals used for explicit inter-block communication. The system diagram 100 shown comprises five functional blocks: a clock generator 106, a sequencer 108, an instruction decoder 112, a data path and interface resources manager 114 and a context controller 110.

Figure 8:
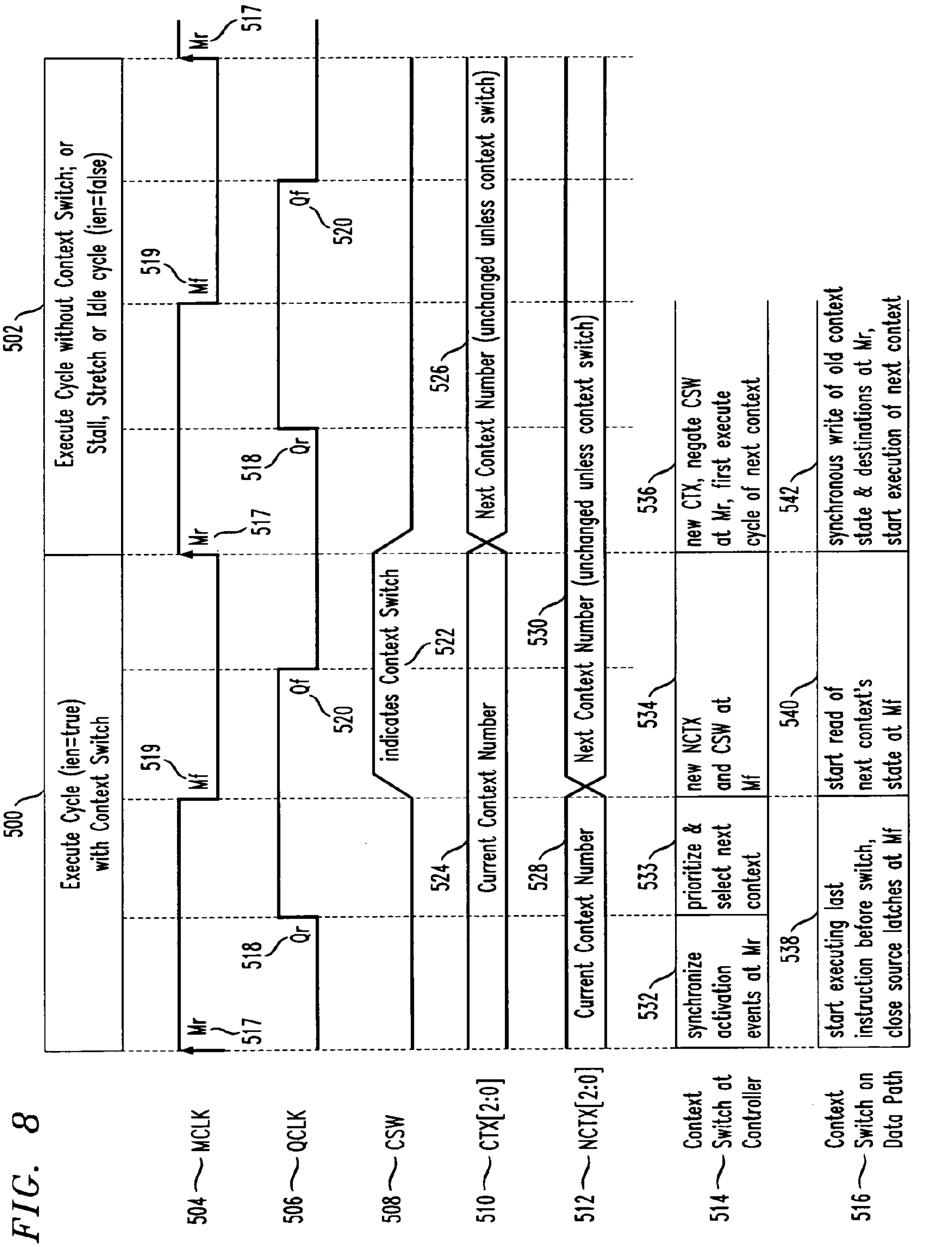
FIG. 8 illustrates a timing diagram for a context switch controlled by the present invention in which a current context's state is stored into, and the next context's state is loaded from, synchronous (self-timed) SRAM or register files.
Figure 9:
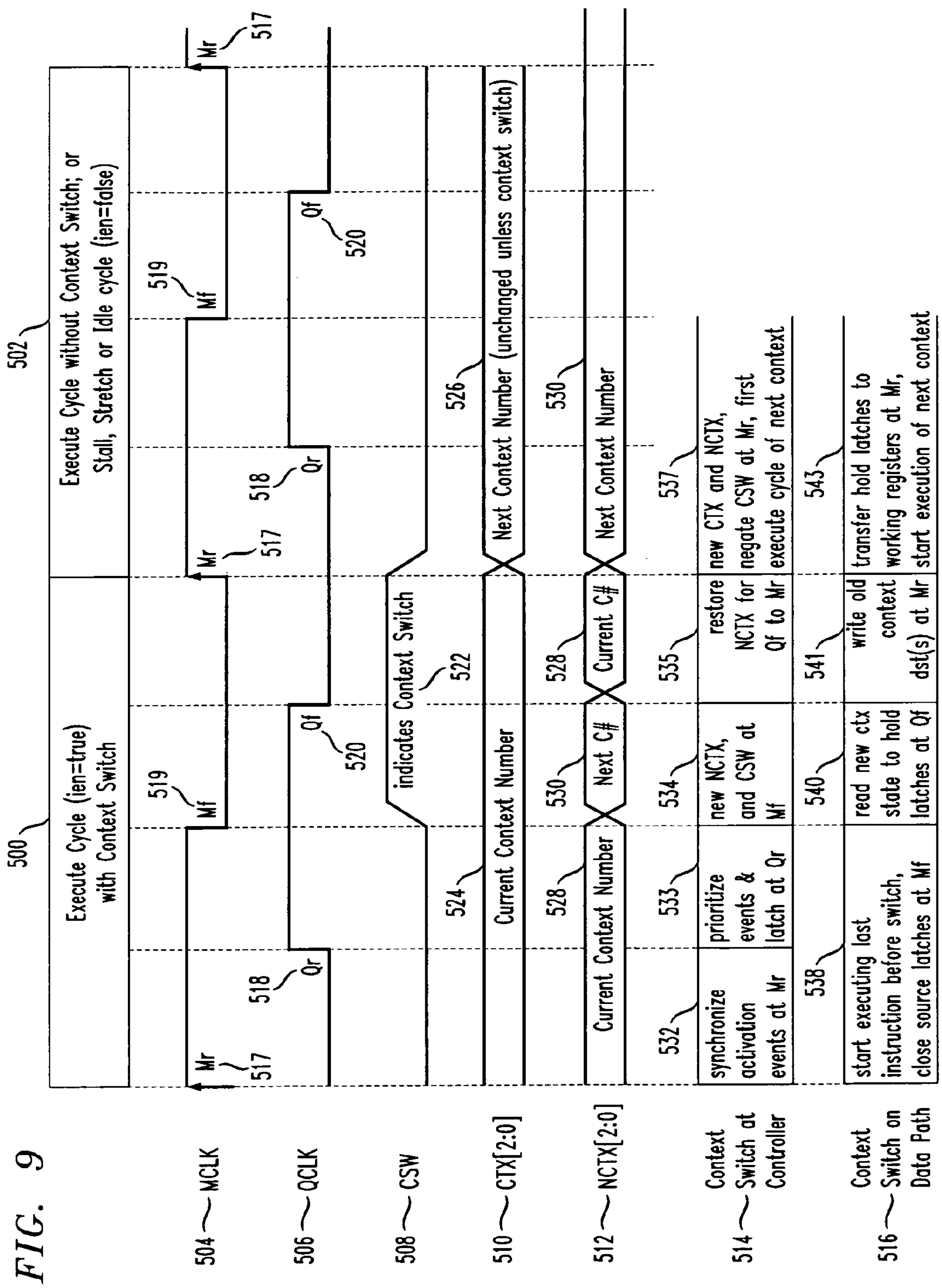
FIG. 9 illustrates a timing diagram for a context switch controlled by the present invention where a current context's state is stored into, and the next context's state is loaded from asynchronous SRAM or register files.

The clock generator 106 accepts an input clock, or time-base reference (e.g., crystal-controlled signal) from which is generated a clock, via ClocksIn channel 122 and a hardware reset signal via ResetIn channel 120. The clock generator 106 generates the cycle clocks used by all other blocks. These cycle clocks subdivide the instruction cycle into four, substantially equal portions. This is done using a pair of square waves in quadrature, resulting in four clock edges at which to initiate various actions. Actual clock waveforms are illustrated in FIGS. 8 and 9, with a master clock MCLK signal 504 delimiting the instruction cycle boundaries and a quadrature clock QCLK signal 506 providing additional clock edges within each instruction cycle. The four edges, in sequential order, are: a rising edge of the MCLK signal 504, designated Mr 517, which marks the end of one instruction cycle and the beginning of the next instruction cycle, a rising edge of the QCLK signal 506, designated Qr 518, which occurs 25% of the way through each instruction cycle, a falling edge of the MCLK signal 504, designated Mf 519, which occurs 50% of the way through each instruction cycle, and a falling edge of the QCLK signal 506, designated Qf 520, which occurs 75% of the way through each instruction cycle.

In the SDL model, the clock generator 106 sends appropriate Mr 517, Qr 518, Mf 519 or Qf 520 signals, as well as a reset signal, to all other functional blocks. The clock generator 106 operates while the processor is either running or idle, but can shut down most of its circuitry, including the generation of the MCLK signal 504 and the QCLK signal 506, during a very-low-power sleep mode, which is entered when the clock generator 106 receives a sleep signal from the context controller 110 via channel ClkCctl 140.

In many implementations, it is not possible to execute an instruction during every clock cycle. As a result, the instruction decoder 112, sequencer 108 and context controller 110 only perform their functions during the cycle when the instruction is actually being executed, as identified by the remote Boolean variable "ien" being true (see text symbols 102).

The sequencer 108 generates instruction addresses and initiates instruction fetch cycles via a ToCS channel 116. These addresses connect to a control store array 117 logically external to the processor 100. Note that, depending on the implementation technology and desired performance level, the control store array 117 and an associated data store 127 may be physically separate, fully co-located in a single memory device, or any hybrid thereof. The sequencer 108 receives context switching signals CsLoad (to retrieve saved context state information), CsStore (to save context state information) and InitSeq (to set a context execution address to the appropriate initialization vector) from the context controller 110 via CctlSeq channel 141.

The instruction decoder 112 receives the instruction words fetched under control of the sequencer 108 via a FromCS channel 118. Decoded instructions are sent as signals, with the instruction field values as parameters, to all other blocks as appropriate. The instructions requiring processing in the context controller 110 are sent via an InstCctl channel 142.

The data path and interface resources manager 114 represents the remainder of the processor, including the ALU, programmer-visible registers and so forth. All of the I/O device, host computer (if any) and local data memory interfaces (channels 126, 128, 130, 132) connect to this functional block. The data path and interface resources manager 114 sends event signals to the context controller 110 and receives an AckEv signal (which indicates that software has executed an ACK function to acknowledge a specific prior Event), CsLoad and CsStore signals (to restore and to save context state information), and SetCy and ClearCy signals (to set and clear a carry flag for use after hardware reset and INIT functions) from the context controller 110 via a CctlIDP channel 143. This functional block also exports the values of ien (equal to true if the current clock cycle is an instruction execution cycle) and slice (the last value specified by software for the initial instruction count for each background time slice).

The context controller 110 advantageously accepts exogenous event signals via an EventsIn channel 124, and communicates with other functional blocks as mentioned above. This functional block also exports the values of Boolean variables asleep (equal to true when in sleep mode), CSW (equal to true during the second half of context switch cycles) and idle (equal to true when there are no active contexts), CtxNum (context number), variables context (the running context's number), and nctx (the number of the context to which execution is being switched). And, this functional block also exports BitString variables events (the current context's event status register) and mask (the current context's event mask register value).

Figure 5:
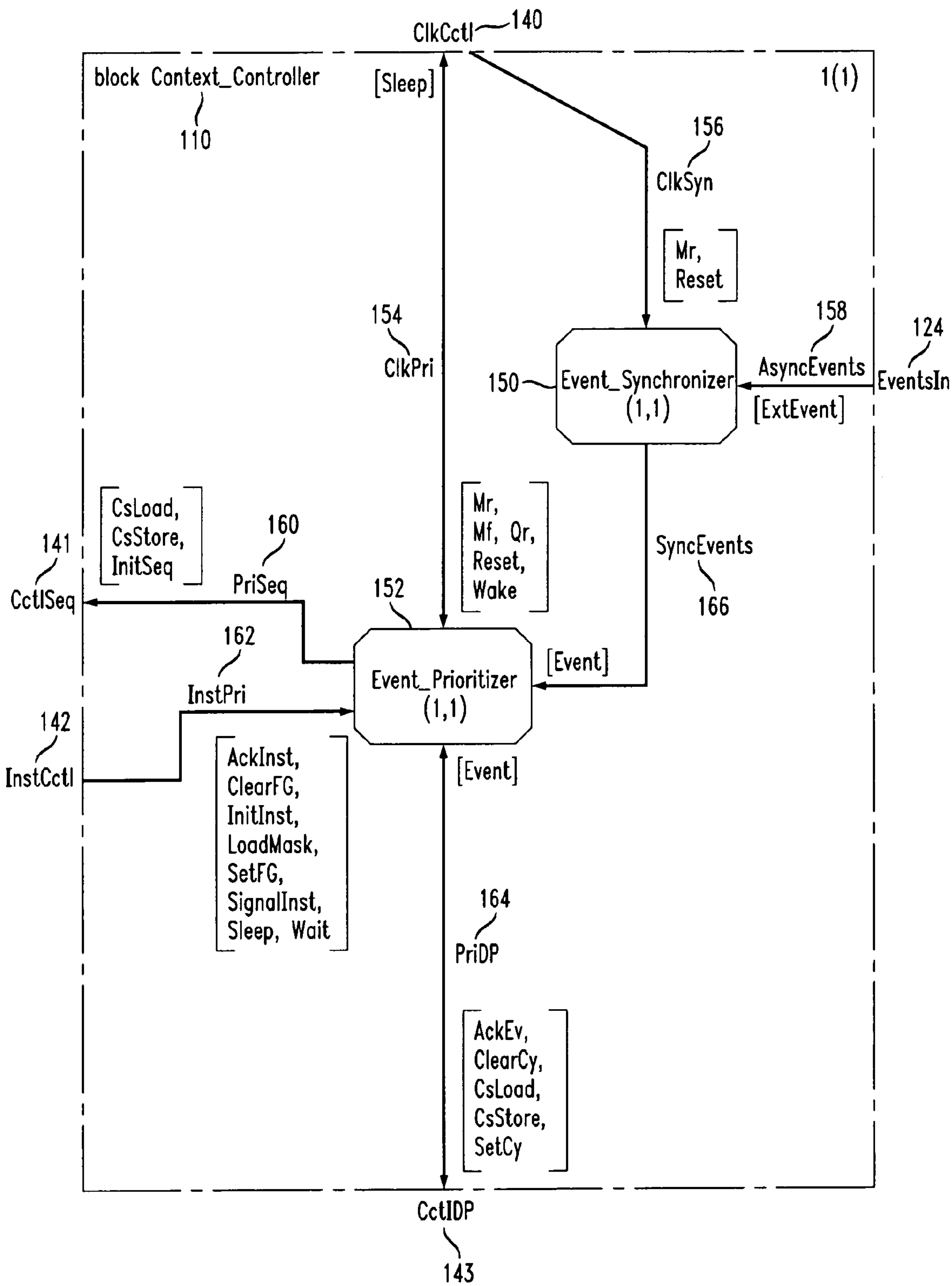
FIG. 5 illustrates an interaction diagram showing an internal structure of the context controller illustrated in FIG. 4.

Turning now to FIG. 5, illustrated is an SDL process interaction diagram showing an internal structure of the context controller 110 illustrated in FIG. 4. The internal structures of the other top-level blocks are not presented herein because they are not part of the present invention and are not required to understand the behavior of the context controller 110.

Two processes are illustrated as being contained in the context controller block 110. An event synchronizer 150 accepts exogenous event signals from an AsyncEvents signal route 158 and synchronizes them with the master clock rising edge Mr 517, which is provided by the clock generator 106 via a ClkSyn signal route 156. These events are sent on, via a SyncEvents signal route 166, as event signals, just as with the (inherently synchronized) event signals from endogenous sources on a PriDP signal route 164.

The fundamental context control state machine operates in an event prioritizer process 152 in this embodiment. The event prioritizer 152 receives input signals from the clock generator 106 via a ClkPri signal route 154, event signals from the event synchronizer 150 via a SyncEvents signal route 166 and data path CctlDP functions 143 via a PriDP signal route 164. Additionally, decode signals for various instructions relevant to context control and inter-context communication from an instruction decoder over the InstCctl channel 142 via an InstPri signal route 162 are received.

Figure 6:
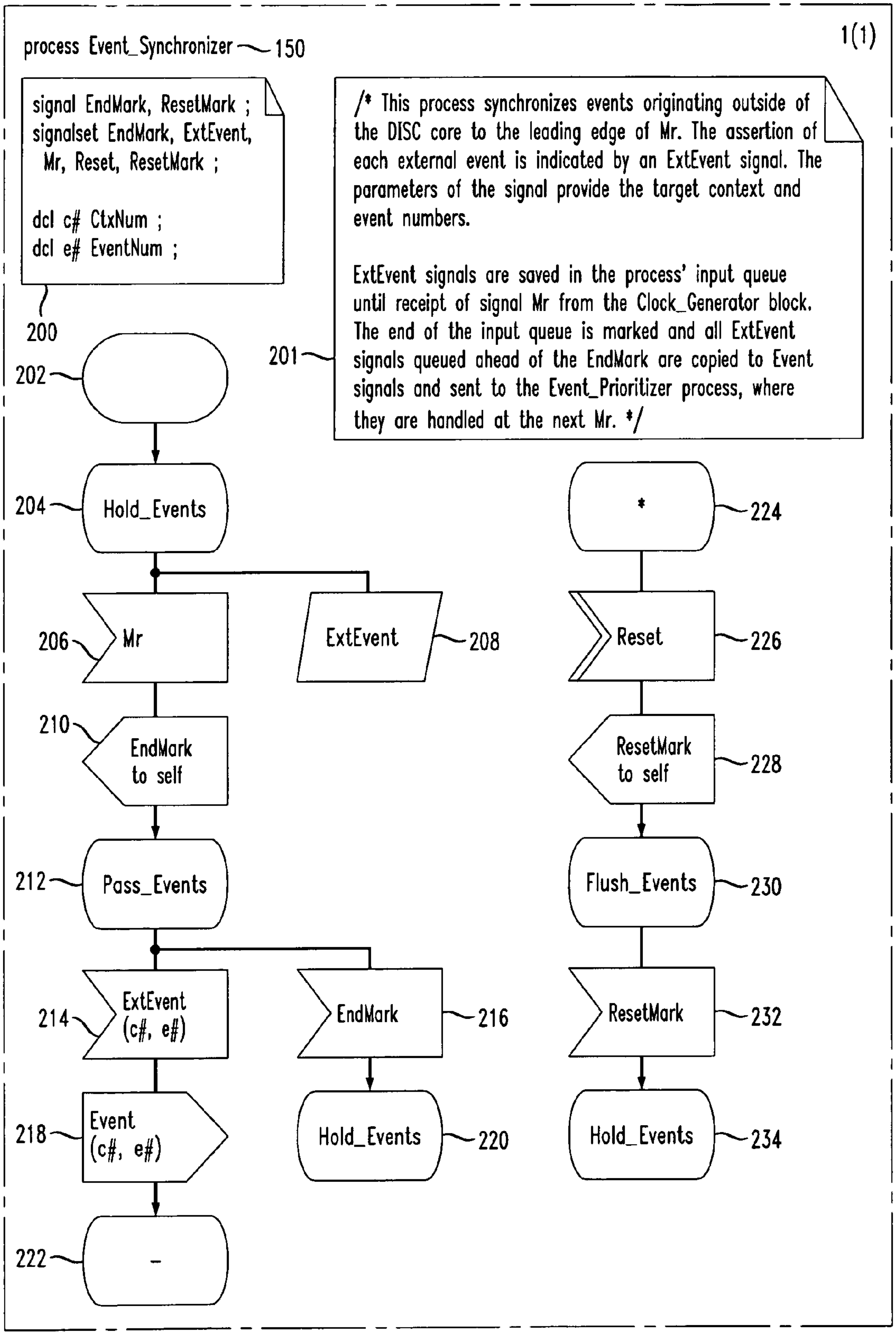
FIG. 6 illustrates a process diagram of an event synchronization process illustrated in FIG. 5.

Turning now to FIG. 6, illustrated is a process diagram of the event synchronization process illustrated in FIG. 5 which depicts the operation of the event synchronizer 150. This process ensures that each incoming ExtEvent signal 208 is saved until the occurrence of a master clock rising edge Mr 206, at which time all saved ExtEvent signals 214 are received and immediately passed to the event prioritizer 152 as Event signals 218.

Turning now to FIGS. 7A, 7B, 7C and 7D, collectively illustrated are process diagrams of the event prioritization process shown in FIG. 5 defining the state transitions of the event prioritizer 152 process. This process implements the event driven and time-sliced context switching functions for this embodiment of the present invention.

FIG. 7A defines the startup and reset sequences. In "all states" symbol 272, a reset signal 274 takes precedence over all other input signals and causes the process input queue (symbols 276–280) to be flushed before joining a startup initialization (symbol 282) starting at a start symbol 254. A sequence (symbols 256–270) initializes all relevant variables, clearing event masks, event status registers and wait flip-flops, setting all contexts to foreground, and clearing all ACT flip-flops, except for that of context 7, which is forced active.

FIG. 7B defines operation during the second half of each cycle, an Mf to Mr period, (a period from a master clock falling edge Mf to its next rising edge Mr), as well as the events immediately following the receipt of a master clock rising edge Mr 292. Running and idle states 284 both have the same transitions, since an instruction is executed during the cycle following a WAIT function, and because events may occur and need to be processed during any cycle, including times when the processor is idle. During the Mf-to-Mr period, all instruction decode signals except an ACK (AckInst), a WAIT or a SLEEP function 300 are processed immediately. These three signals are saved for processing after the master clock rising edge Mr 292 because they must be handled after all Event signals 288 have been processed. The instructions handled ahead of the master clock rising edge Mr 292 (that is, the signals 286, 290, 294, 296, 209) may alter information that has to be saved at the master clock rising edge Mr 292 if a context switch occurs.

After the master clock rising edge Mr 292, on cycles when ien is equal to true (one)(293), the values of CSW (context switch in progress flag), CTX (current context number), NCTX (next context number), and the event mask and event status registers are updated (symbols 320, 321, respectively). The processor may enter a Sleeping state (symbol 338) during which the processor clocks stop, and only a low-frequency sleep timer operates until either a sleep timeout (a Wake signal, in symbol 340) or a hardware reset occurs. If not asleep, a time slice instruction count is decremented (symbol 330) if a background context is running (symbols 326, 328). If the slice count decrements to zero (symbol 332), a time slice context switch is initiated by advancing the round-robin curBg (current background context) pointer by one, modulo the number of contexts (symbol 334), and the time slice instruction count is reset (symbol 335) to its programmed value. Then a prioritize state 336 is entered to handle an Mr-to Qr period (a period from a master clock rising edge Mr to the next quadrature clock rising edge Qr).

Figure 7C:
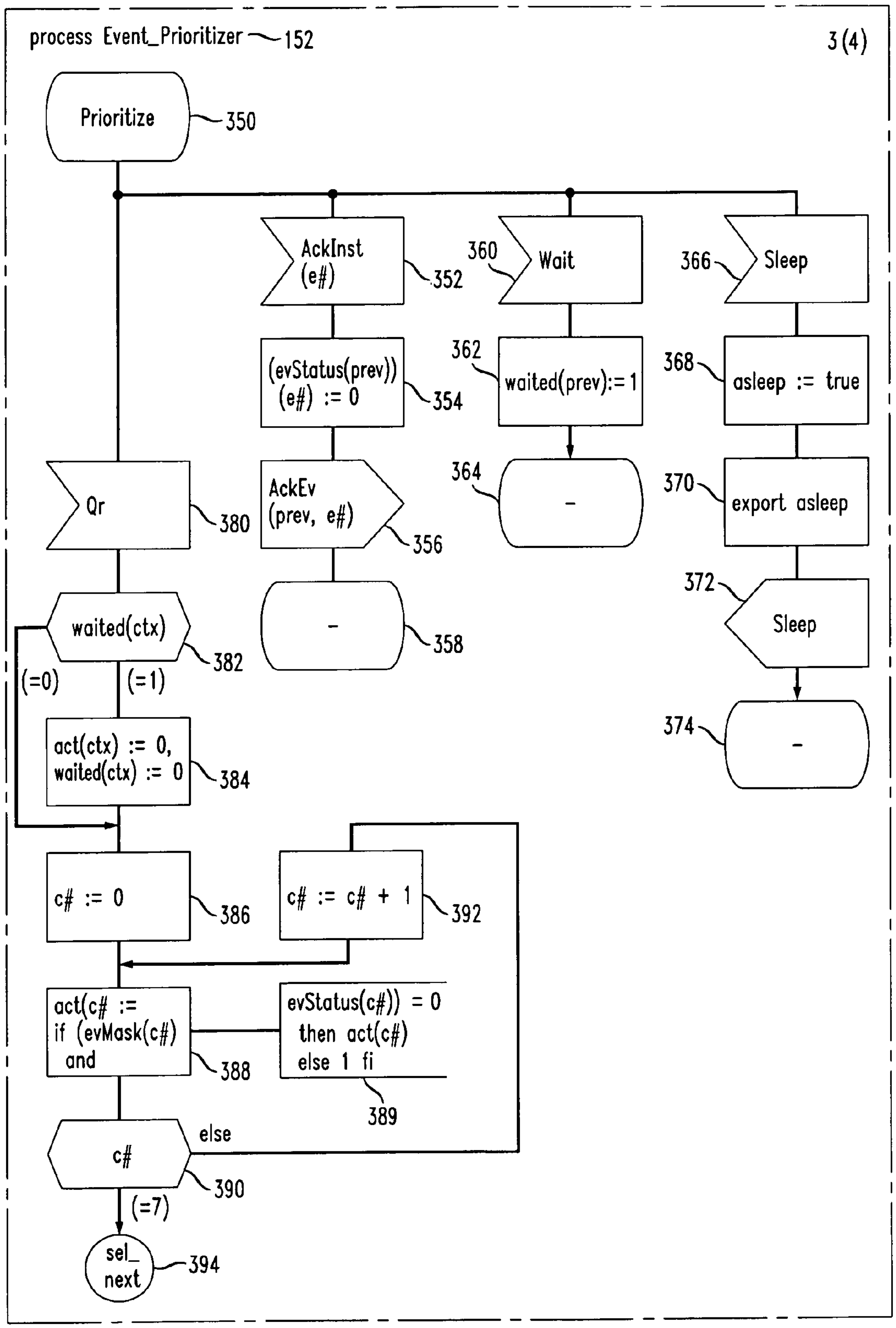

FIG. 7C defines operation during the first quarter of each cycle (the Mr-to Qr period). This is the time when the events sampled at the master clock rising edge Mr 292 are masked and the ACT flip-flops are updated in preparation for making a context switching decision after a quadrature clock rising edge Qr 380. An ACK (AckInst) signal 352, a WAIT signal 360 and a SLEEP signal 366 are handled prior to the quadrature clock rising edge Qr 380, and a masking and ACT updating sequence (symbols 386–392) occurs following the quadrature clock rising edge Qr 380.

The updating of ACT bits is depicted as an iterative process (symbols 388–392) for clarity regarding the operation being performed. This operation is typically performed for all contexts in parallel. A subtle, but very important action in FIG. 7C is the handling of a WAIT function 360, where the occurrence of the WAIT function 360 is recorded at the index of the previous (prev) context (symbol 362) (which is the context that was running prior to the master clock rising edge Mr 292 when the WAIT function 360 was decoded). Then the clearing of the ACT flip-flop (symbols 382–384) is done at the index of the current (ctx) context. The values of prev and ctx will be equal both before and after the quadrature clock rising edge Qr 380 in all cases except when a context switch occurred immediately preceding the master clock rising edge Mr 292. This means that a context executing a WAIT function on the last cycle before a context switch remains active, but with its Wait flip-flop (bit in the waited bit string) being equal to one until that context is again able to run and execute the instruction following the WAIT function. Another interesting action in FIG. 7C is the sending of an AckEv signal 356 to the Data Path when an ACK function 352 is processed. This is done to permit side-effects in the device or host interface logic to be performed when a specific event is acknowledged.

FIG. 7D defines operation during the second quarter of each cycle, a Qr-to Mf period, (a period from a quadrature clock rising edge Qr to the next master clock falling edge Mf). This is the time period when events are prioritized and the context switching decisions are made. The first set of actions (symbols 422–428) searches for a possible preemption. The search is depicted as an iterative process for clarity regarding the operation being performed. This operation is typically performed for all contexts in parallel. If the running context is in foreground, the search is over the range 0:ctx, whereas if the running context is in background the search is over the range 0:7 because all foreground contexts have priority over any background context (symbol 423). The priority encoding (symbol 424) is implicit in the ascending context number 424 (descending priority) sequence. If an active, foreground context is found, its number is recorded in nctx (symbol 452). Otherwise, a search (blocks 430–434) is conducted for an active background context starting at the indicated current background context and continuing to higher context numbers (modulo 8).

If a time slice (the symbol 334 of FIG. 7B) ends at the master clock rising edge Mr 292 of this cycle, the indicated curBg will already have been incremented, meaning the search will start from the context after the one that is currently running and will only re-select the same context if no other contexts are in the queued state Qb. In the case of a preempted context in the background running state Rb that can now be resumed, this test (symbol 430) will exit immediately to a set new context number (nctx) 450. If either a foreground (symbol 452) or a background (symbol 450) search finds a context to run, the nctx is compared with the current context number (ctx) (symbol 454) to determine whether a context switch is needed. If a context switch is not needed, no further context control activities occur during this cycle and the controller returns to a running state 458.

If a context switch is required, the controller enters Start—CSW state 456 saving the input signals 462 until a master clock falling edge Mf occurs (symbol 460). Then CSW (symbols 474–476) is asserted, and the loading of the saved state of the next context (symbol 478) is initiated while saving the current context state (symbol 480) is requested. The reason loading is requested before storing is explained below more fully in conjunction with FIGS. 8 and 9.

If there are no active contexts, the controller saves all input signals (symbol 440) until the master clock falling edge Mf occurs (symbol 438), then indicates an Idle state 442 and requests saving the current context state 446 before actually entering an Idle state 448. The context state is saved because there is no guarantee that the same context will be the first context to run at the end of the idle period. In effect, the transition to and from the Idle state 448 is a split context switch, with saving during the transition to idle (symbols 442–446), and loading during the transition from idle (symbols 466–470). During the idle state, the clocks continue to run and events continue to be sampled, but instructions are neither fetched nor executed. The processor remains ready to act, however, on the occurrence of an event during the idle state.

If the processor is implemented using complementary metal oxide semiconductor (CMOS), or another process technology where power consumption is very low or essentially zero when the circuit elements are not being clocked or changing level, the Idle state 448 provides an inherent power saving mode for most of the processor, including sequencer, instruction decoder and data path. If a still lower power operating mode is desired, the SLEEP function 366 (in FIG. 7C) can stop the high-speed clocks, along with suspending event monitoring, leaving only a low-frequency sleep timer in operation.

Turning now to FIG. 8, illustrated is a timing diagram for a context switch controlled by the present invention in which a current context's state is stored into, and the next context's state is loaded from, synchronous (self-timed) SRAM or register files. The timing diagrams depicted (in both FIGS. 8 and 9) identify the differences required to use each of two different types of memory technology for storing the execution states of non-running contexts. Each of these timing sequences has the beneficial advantage that the context switch operation does not require extra cycles to save and restore the context execution state, but rather performs this function in parallel with execution of the last instruction of the context being switched. To employ this technique, a processor data path should include dedicated register files or static RAM (SRAM) arrays for each register in the execution state. The illustrated embodiment of the invention may be used in conjunction with processor data paths that do not provide such storage. However, more overhead is associated with context switching on such processors, due to possible extra cycles and an execution of additional instructions to save and restore context execution states.

The simpler timing and control signal sequencing, shown in FIG. 8, is achieved when the save arrays are implemented using synchronous static (self-timed) RAM (SRAM). This is also the timing that results from a direct implementation based on the SDL process defined in FIG. 7. Although programmer-visible behavior is identical, greater complexity is required to use asynchronous static RAM for the save arrays (as will be discussed in conjunction with FIG. 9). An approach using synchronous SRAM permits shorter cycle times and lower power consumption due to a reduced number of signal transitions and an elimination of control signal duty cycles shorter than 50% of the instruction cycle time, assuming identical performance of the synchronous SRAM and asynchronous SRAM devices.

The synchronous SRAM captures the write address and data at a leading edge of each write enable pulse, and completes the write operation using internally generated control signals, without need for stable input signals (other than power) during the remainder of the write cycle. Cell-based, semi-custom integrated circuits employing synchronous SRAM that use register file cells with both a read port and a write port having independent addresses are readily available. The control signal timing for a context switch becomes relatively simple when using these synchronous SRAM cells to implement the save arrays, as shown in FIG. 8.

During each instruction execute cycle 500, 502 a context controller 514 samples activation event signals at a master clock rising edge Mr 517 allowing the first quarter of the cycle for settling and gating of the synchronized signals (time interval 532). At a quadrature clock rising edge Qr 518, all ACT flip-flops are updated and the priority encoding and comparison operations determine the need for a context switch, selecting a next context if required (time interval 533). In parallel with these context controller activities, a processor (time interval 516) has been executing an instruction initiated at the master clock rising edge Mr 517, without regard for whether a context switch may be necessary during this instruction execution cycle. If a processor data path has combinatorial paths from internal register sources that are expected to be stable throughout the execution cycle, values on these paths must be latched at a master clock falling edge Mf 519 to permit readout of a saved state of a next context to begin (time interval 540). Alternately, if a processor designer prefers to add overhead cycles for reading a saved context state, this latching is not required. But, in most cases, one or more cycles are inserted and a net effect will be a slowdown of processing and real-time response if these latches are eliminated, resulting in a period when instructions cannot be executed between a last instruction cycle of an old context and a first instruction cycle of a new context.

At the master clock falling edge Mf 519, the context controller can determine whether a context switch is required (time interval 534), and assert an CSW signal 522 if so. The target state to be restored is indicated by placing a context number of a next context on a NCTX[2:0] signal group 530. This starts a "saved State" readout of a next context (time interval 540) using a NCTX[2:0] signal group 512 to address the save arrays in parallel with a completion of the last instruction of the current context (whose context number remains on a CTX[2:0] signal group 524).

At the end of this context switch cycle designated by the master clock rising edge Mr 517 (separating cycle 500 from cycle 502), an execution state of a current context, including an outcome generated during this execution cycle 500, is stored (time interval 542) using a CTX [2:0] signal group 510 to address the save arrays. The save array write operation (a time 542) is initiated by the master clock rising edge Mr 517 when a CSW signal 508 is asserted (time interval 522). Due to the advantageous characteristics of writing to synchronous SRAM, a first instruction of the next context can commence execution immediately (time interval 536), since neither the address nor data being written to the save array has to be held after the master clock rising edge Mr 517 occurs, which ends cycle 500. For proper execution, the synchronous SRAM cycle time, including write recovery, may not exceed 50% of an instruction cycle period. The same master clock rising edge Mr 517 transition that initiates an SRAM write may also be advantageously employed to complete a context switch with a CSW signal 508 negated and a CTX [2:0] signal group 510 updated to a new context number 526.

Turning now to FIG. 9, illustrated is a timing diagram for a context switch controlled by the present invention in which the current context's state is stored into, and the next context's state is loaded from, asynchronous SRAM or register files. Conventional, or asynchronous, SRAM requires that a write address and data be stable throughout a relevant portion of a write cycle. This necessitates a setup time prior to a trailing edge of a write enable pulse and sometimes requires a short hold time following this trailing edge. Many semi-custom integrated circuit technologies can supply RAM arrays or register files using asynchronous SRAM that provides a single address and data port which may be used for either reading or writing. Separate SRAM and register file chips that operate in this manner are also widely available.

To use this type of conventional, single-port SRAM to implement the save arrays, control signal timing for a context switch becomes somewhat more complicated, as shown in FIG. 9. General timing is the same as in FIG. 8, and similar elements are identified using the same reference numbers. A primary difference is the generation of the NCTX[2:0] signal group 512, in operations by a context controller 514, and a data path 516 during and immediately after an assertion of a CSW signal 548 (as detailed in times 522, 528, 530, 534, 535, 537, 540, 541, 543 of FIG. 9). It is necessary to use asynchronous SRAM with a cycle time that does not exceed 25% of the instruction cycle period including write recovery in order to avoid insertion of overhead cycles, assuming no instructions are executed while saving and restoring a context state. This speed requirement is twice as fast as that needed to achieve the same processor cycle rate when using synchronous SRAM.

The context switch activities are identical during the first half of the context switch cycle (time intervals 532, 533, 538). At a master clock falling edge Mf 519 of the context switch cycle, a CSW signal 508 is asserted (time interval 522) and a NCTX[2:0] signal group 512 is set to the next context number (time interval 534). Address and data information must be stable while writing the results of the last instruction executed by the current context into the save arrays. Therefore, only a period from the master clock falling edge Mf 519 to the next quadrature clock falling edge Qf 520 is available for readout of the saved state for the next context (time interval 540). This outcome is then preferably latched and held during a period from the quadrature clock falling edge Qf 520 to the next master clock rising edge Mr 517. Then, these latched values are advantageously transferred to the processor's working registers (time interval 543). At the quadrature clock falling edge Qf 520, the value of the NCTX[2:0] signal group 512 switches back to the current context number (time interval 535), allowing the current context state including results of this instruction (cycle 500) to be written to the save arrays (time interval 541). At the master clock rising edge Mr 517, the NCTX [2:0] signal group 512 switches back to the next context number (time interval 530) and execution of a first instruction of the next context begins (time interval 537).

Unlike the synchronous SRAM implementation, the write operation is completed at the master clock rising edge Mr 517. Use of the asynchronous SRAM requires that the data path results be stable relatively early to allow writing to the save arrays during the interval from the quadrature clock falling edge Qf 520 to the master clock rising edge Mr 517. Whereas with synchronous SRAM, the data path results are not needed until just prior to the master clock rising edge Mr 517, which facilitates shorter instruction cycles and therefore faster processing.

Figure 10:
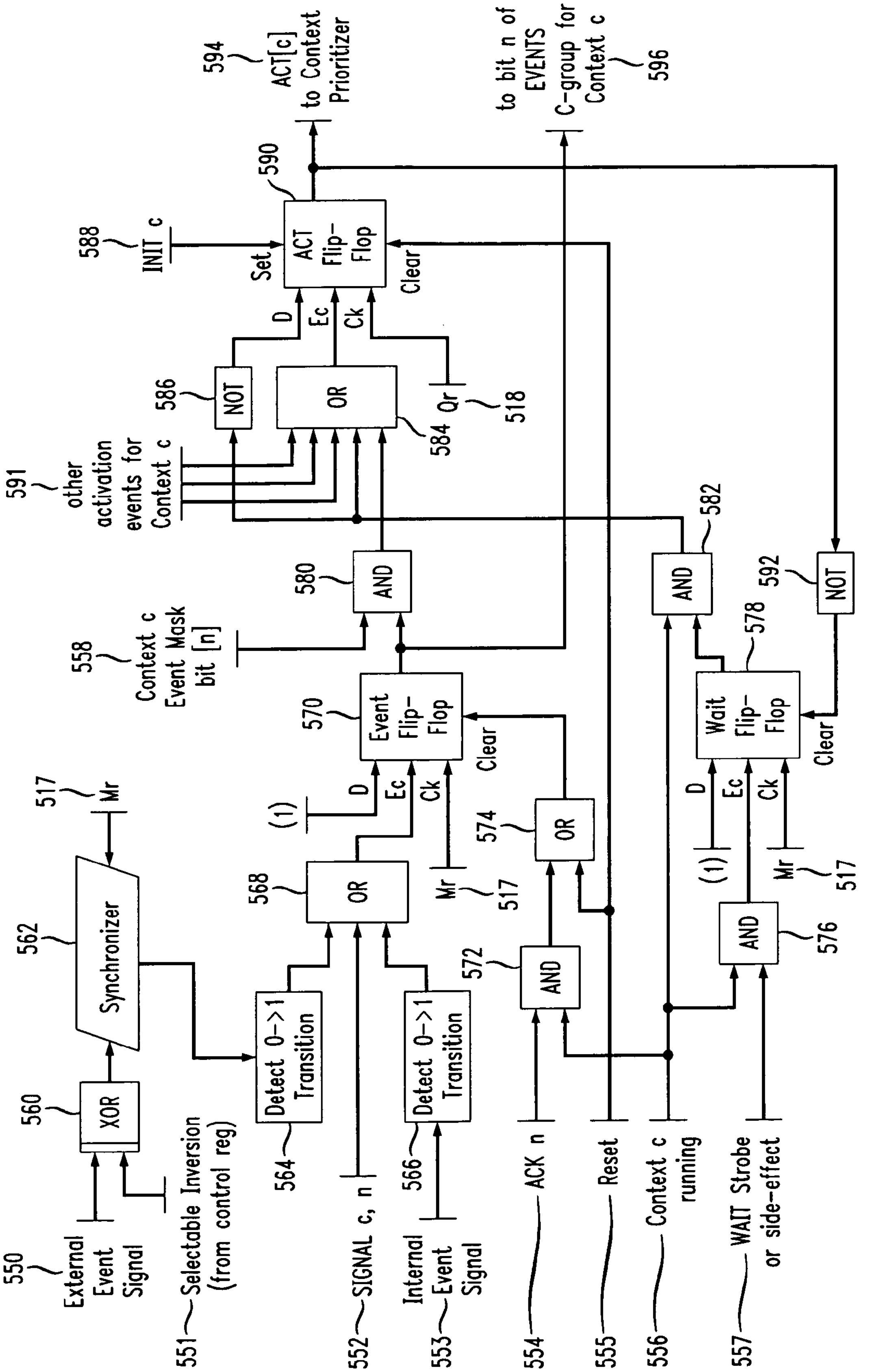
FIG. 10 illustrates a schematic diagram of one embodiment of a circuit suitable for implementing event recording, event masking and event acknowledgment for each activation event, as well as management of a context activity bit, including initialization request and wait request logic.

Turning now to FIG. 10, illustrated is a schematic diagram of one embodiment of a circuit suitable for implementing event recording, event masking and event acknowledgment for each activation event, as well as management of a context activity bit, including initialization request and wait request logic where the details of event recording, masking and acknowledgment within the context controller may better be understood.

A generalized schematic fragment of a "slice" of a context controller event logic is presented for a single event including an ACT bit and WAIT function logic of the context associated with that event. In this diagram, all logic signals are considered to be asserted in the "high" true (logical one) state. This schematic fragment is illustrative of an embodiment of the event logic and is not meant to be a limitation on practice of the present invention.

An exogenous event signal 550 may be asserted with either polarity, so a programmable inversion function 560, under control of a software signal 551 may be provided to establish a high-true signal for internal use. Because this exogenous signal has an undetermined phase relationship with the internal clocks, a synchronizer 562 that synchronizes the input signal with a master clock rising edge Mr 517 prior to its internal use is employed. A plurality of sources may be used to set an event flip-flop 570 including a leading edge of a synchronized external signal 564, a leading edge of an internal source 566, or a software SIGNAL function 552 which designates this context and event. These event sources are combined by an OR gate 568 whose output enables an event flip-flop 570 to be set at the master clock rising edge Mr 517.

Because the event flip-flop D-input 570 is hardwired true (to a logical one as shown), negation of an event signal after setting the event flip-flop 570 does not rescind the event. The event flip-flop output 570 may be read by software as a bit in the event status register 94 and as a testable condition in an events condition signal group 596 if the processor provides instructions such as the SKPn of the illustrated embodiment (as described below). The event flip-flop 570 can be cleared either by a hardware reset 555 or an AND gate 572 output, whose ANDed inputs incorporate the execution of an ACK (acknowledge) function 554 for this event number while this context is running (a signal 556), applied through an OR gate 574.

An appropriate bit for this context event from the context's event mask register 94, event mask bit 558 is ANDed in an AND gate 580 with an event flip-flop output 570 and applied to the input of an ACT flip-flop 590 through an OR gate 584. The output of this AND gate 580 is also used when performing priority encoding of the context events for the VECTOR function, as is described in greater detail below. A masked event signal from the AND gate 580 is ORed in the OR gate 584 with the masked event signals from all other events associated with this context including a signal from the output gate of the wait logic through an AND gate 582.

A logical true output condition of the OR gate 584 enables the ACT flip-flop 590, allowing the ACT flip-flop 590 to be set to the output value of a NOT inverter 586 at the quadrature clock rising edge Qr 518. By using the output of the AND gate 582 and an inversion of the same signal through the NOT inverter 586, the Act flip-flop 590 D-input may be enabled. The ACT flip-flop 590 is set at the quadrature clock rising edge Qr 518 if one or more activation events are asserted, and no WAIT function was executed during the preceding instruction cycle. The ACT flip-flop 590 may % also be set directly by execution of an INIT function 588 to this context, and cleared directly by a hardware reset signal 555. The ACT flip-flop output 590 is also used by the context priority logic and is inverted by a NOT inverter 592 to clear a WAIT flip-flop 578. The ACT flip-flop 590 is cleared through the NOT inverter 586 if a WAIT function was executed during the preceding instruction cycle whether or not any activation events are asserted.

The WAIT flip-flop 578 is needed because a context may be preempted between executing a WAIT function and executing an instruction which follows the WAIT function. (An example of this occurrence is shown at 53, 54 and 58 of FIG. 2). When a WAIT function 557 is decoded by an AND gate 576 while this context is running (a signal 556), the WAIT flip-flop 578 is enabled to set at the master clock rising edge Mr 517. Because a context must be active to execute a WAIT function, this action records the occurrence of the WAIT function since the output of the ACT flip-flop 590 being in the true state negates the clear input of the WAIT flip-flop 578 through the NOT inverter 592.

At the next quadrature clock rising edge Qr 518, in which this context is a running state (the signal 556), the ACT flip-flop 590 is cleared due to assertion of the AND gate output 582. If this context is preempted or time-sliced at the same instruction cycle boundary (the master clock rising edge Mr 517) that the WAIT flip-flop 578 is set, the context will not be running. Hence, the context running signal 556 will be negated prior to the next quadrature rising edge Qr 518, and the ACT flip-flop 590 will remain set. When this context resumes running, the ACT flip-flop 590 will be cleared at the quadrature clock rising edge Qr 518 of the first instruction cycle causing the context to become inactive after executing this one instruction. The negation of the ACT flip-flop output 590 clears the WAIT flip-flop 578 via the NOT inverter 592.

Figure 11:
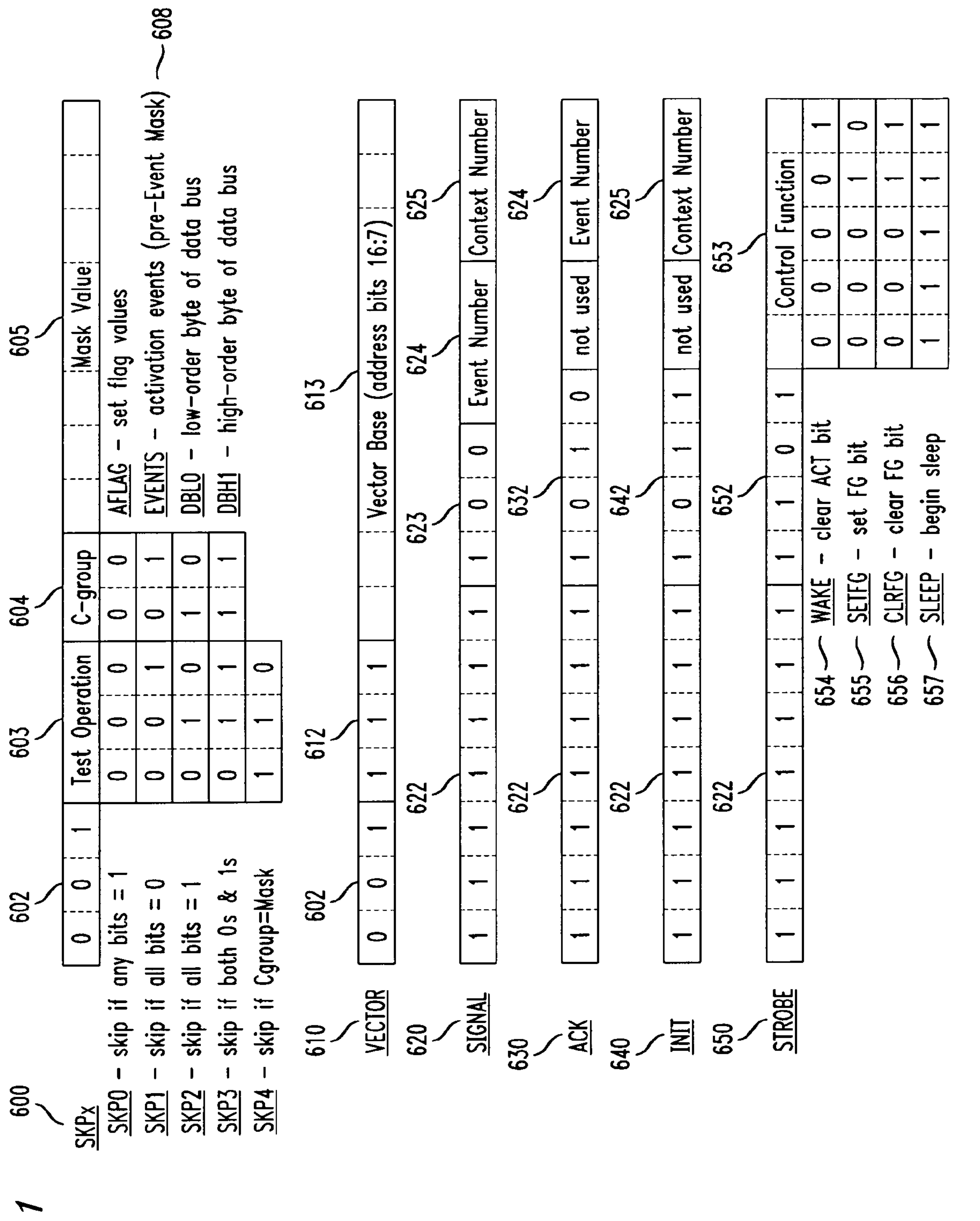
FIG. 11 illustrates field and bit assignments of machine instructions pertaining to context control and inter-context communication in the instruction set according to one embodiment of the present invention.

Turning now to FIG. 11, illustrated are field and bit assignments of machine instructions pertaining to context control and inter-context communication in the instruction set according to one embodiment of the present invention. The details of the instruction decoding and field encoding are not directly relevant to the present invention, and this figure is included primarily to illustrate the operand fields that provide information needed by the context controller.

Testing of bits in the context event status register 94 is most efficiently accomplished using SKPx instructions 600. These instructions perform a test under mask or bitwise comparison between a specified "condition group" (C-group) 604 of eight related signals and an eight-bit mask value 605 contained in the instruction word. If the condition specified by a test operation 603 is true, the instruction following the SKPx is skipped. Relevant to the present invention is C-group 01, an "EVENTS" group 608 which is unaffected by the event mask and which tests the contents of the event status register 94 of the running context.

A VECTOR instruction 610 is decoded from the same opcode 602 as the SKPx instructions but has a distinctive value in its "test operation" field 612. The other 10 bits of the VECTOR instruction word are a vector base address 613 whose use is described below.

A SIGNAL instruction 620 is used to implement an inter-context software signaling function previously described. The SIGNAL instruction 620 is one of the processor control instructions based on the value of an extended opcode field 622 with a distinctive subdecode value 623. Two parameter fields are decoded within the context controller when a SIGNAL instruction is executed. A specified event number 624 identifies a particular event to assert among the events associated with a specified context number 625. All events may be the target of the SIGNAL instruction 620, but implementation details in particular instances of this context controller and connected event sources may make it difficult to allow the SIGNAL instruction 620 to assert certain conditions.

An ACK instruction 630 and an INIT instruction 640 are formatted and decoded in a similar way to the SIGNAL instruction 620 but have only one parameter field each. The ACK instruction 630 carries only an event number 624, because acknowledgment of a context's events is only permitted by code executing in the same context, so a context number parameter would be superfluous. An INIT instruction 640 carries only a context number 625 because the initialize function is directed to a context, not to an event associated with a context.

A STROBE instruction 650 can generate a specified one out of as many as 32 discrete, imperative control functions 653. A WAIT instruction 654, is of relevance to the context controller, which clears the ACT bit of the running context; a SETFG instruction 655, which sets the FG bit of the running context; a CLRFG instruction 656, which clears the FG bit of the running context; and a SLEEP instruction 657, which causes the context controller to suspend operation and to allow the processor to enter an extremely low-power sleep mode.

The INIT instruction 640 is used to force the target context into a known state either for initialization or for error recovery. Execution of the INIT instruction 640 sets both the ACT and FG bits to be logically true in the context specified in the instruction. It also sets a context CY (carry) flag to allow contexts to distinguish between hardware reset (when CY is equal to zero) and INIT (when CY is equal to one) and forces the context to begin executing at a context-specific initialization vector.

Figure 12:
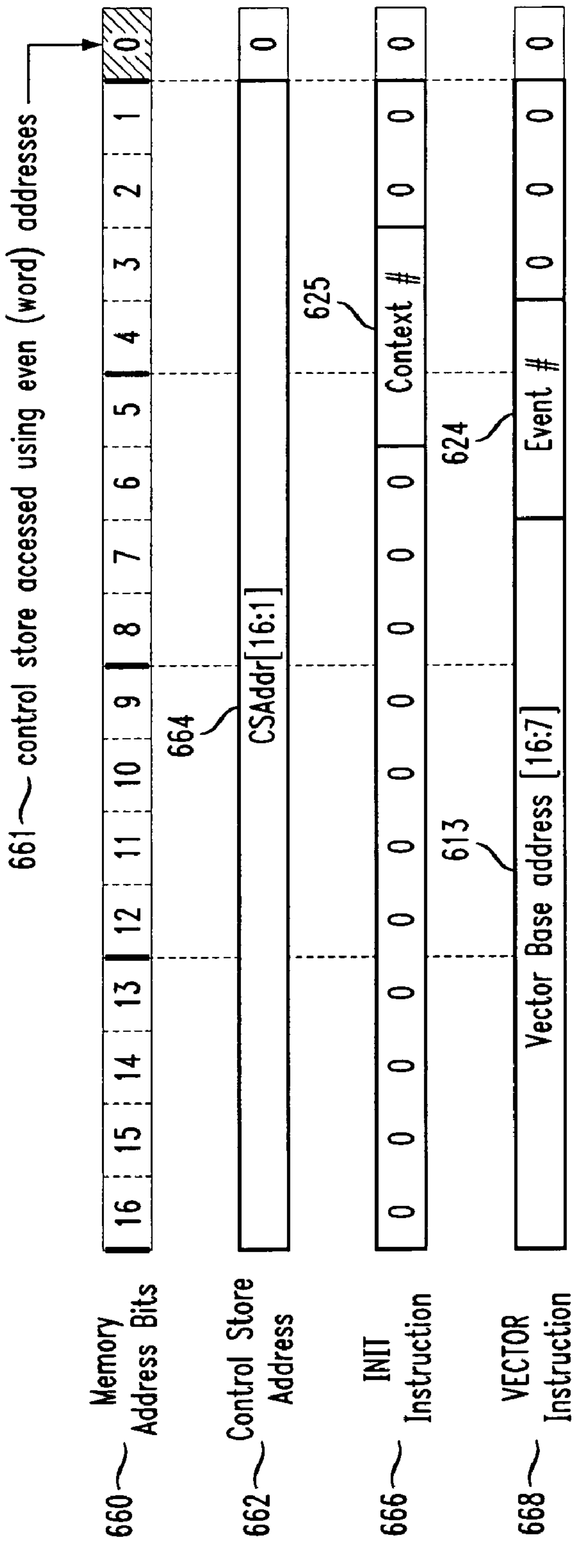
FIG. 12 illustrates sources of bits used to generate control store addresses on the processor according to one embodiment of the present invention.

Turning now to FIG. 12, illustrated are sources of bits used to generate control store addresses on the processor according to one embodiment of the invention. The initialization vector address for a context-specific initialization vector mentioned above, may be formed by placing the contents of a context number field 625 of the INIT instruction 640 (of FIG. 11) into bit locations five through three of an address word containing all zeros as seen in an entry for an INIT Instruction 666 shown in FIG. 12.

Figure 13:
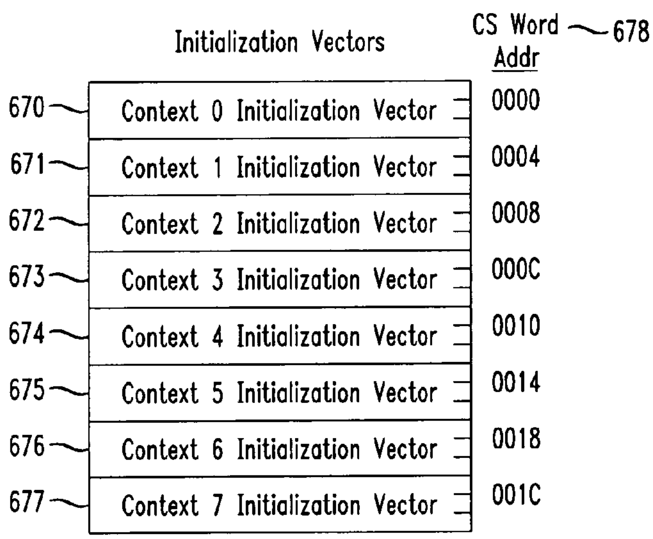
FIG. 13 illustrates an exemplary data structure diagram for initialization vectors in control store according to one embodiment of the present invention.

Turning now to FIG. 13, illustrated is an exemplary data structure diagram for initialization vectors in control store according to one embodiment of the present invention. As shown, this embodiment uses a set of eight initialization vectors 670–677 located at successive four-word intervals, control store address pattern 678 starting at control store address 0×0000. A four-word vector pitch was chosen because a long, absolute branch on this processor requires three words, and all but the last (context 7) vector 677 are likely to require such a branch. Requiring no branch for context 7 is useful because context 7 is the sole context to be active after hardware reset.

Therefore, the code at the context 7 initialization vector is used to initialize the other contexts after hardware reset and for handling an INIT function to context 7. The vector pitch for use on other processors can be chosen in an embodiment-dependent manner. It is also desirable on some processors to use the contents of the initialization vector as an address which performs an indirect branch through the vector, rather than starting program execution at the vector address. The VECTOR instruction 610, shown in FIG. 11, is useful for priority-based decoding of the event(s) causing context activation.

Figure 14:
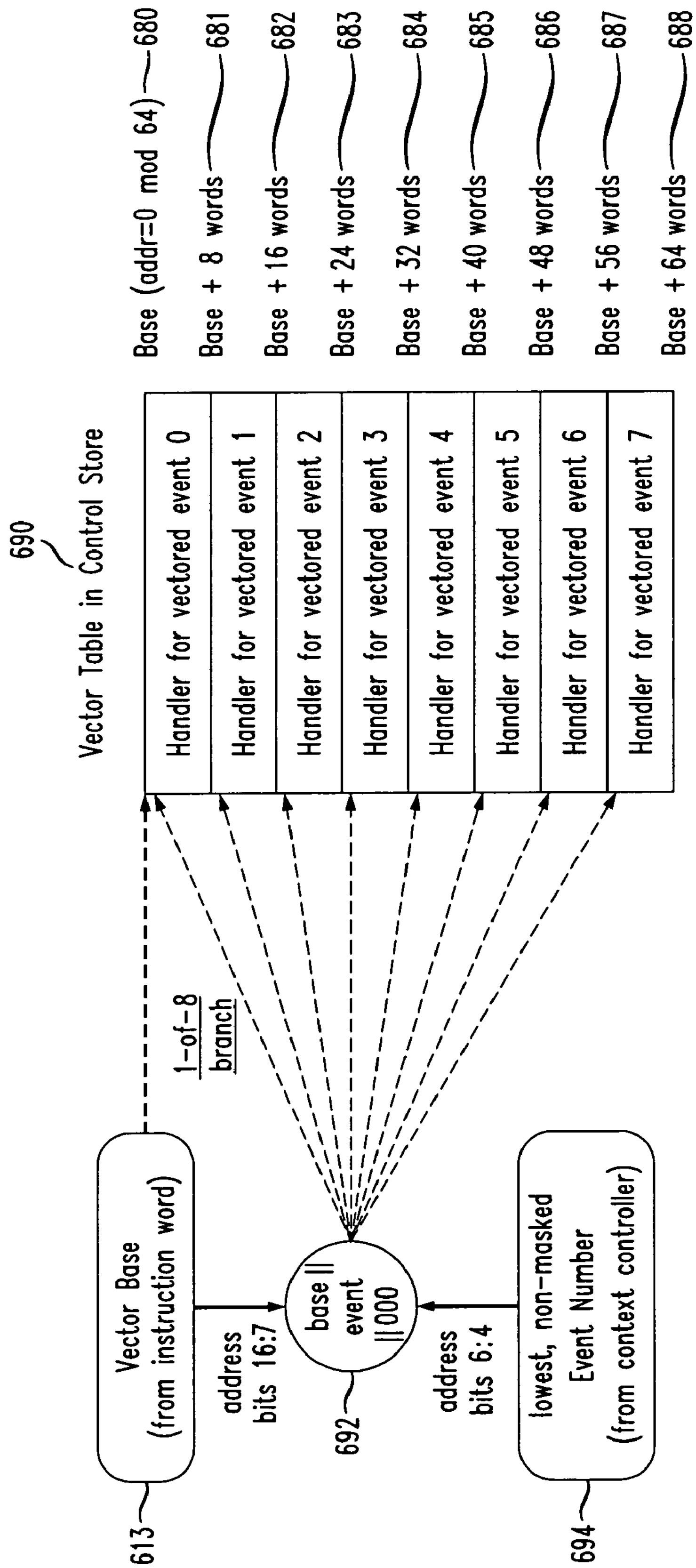
FIG. 14 illustrates a diagram setting forth target address generation by vector instruction used to prioritize and decode specific context activation bits on the processor according to one embodiment of the present invention.

Turning now to FIG. 14, illustrated is a diagram setting forth target address generation by vector instruction used to prioritize and decode specific context activation bits on the processor according to one embodiment of the present invention. As stated earlier, the VECTOR instruction 610 is useful for priority-based decoding of the event(s) causing context activation. When executed, this instruction branches to one of a set of eight handlers 680–687 in a vector table 690 located in control store.

A vector table base address 613 is specified in the ten lowest-order bits of the VECTOR instruction word 610. A specific vector is selected by priority encoding the context event status register 94 ANDed with the context event mask register 90. Then, using a resulting event number 694 as bit positions six through four along with a set of zeros 692 in bit positions three through zero of the vector address 678 (as seen in FIG. 13) causes execution to continue at the beginning of the eight-word handler location 680–687 assigned to the highest-priority (lowest-numbered) asserted non-masked event. Because the VECTOR instruction 610 shown in FIG. 11 is normally used shortly after reactivation following a WAIT instruction 654, there is reason to expect that at least one non-masked event flip-flop will be true (equal to one). If this were not the case, the context would not have become active. However, it is possible to include a vector at Base+64 words 688 for the case where no event bits are set.

For the instruction set of the current embodiment, this vector pitch of eight words permits many handlers to fit entirely within the vector table requiring no branch while handling that event. For embodiments which provide a vector decode function of this type, the pitch may be chosen to achieve a balance between fitting the entire handler set into the vector table and leaving substantial amounts of control store unused due to the handler areas being much longer than is generally required.

From the above, it is apparent that the present invention provides a context controller for managing multitasking in a processor and a method of operating the same. In one embodiment, the context controller includes: (1) a time slice instruction counter that counts a number of instructions executed with respect to a given background task and (2) a background task controller that cyclicly executes a context corresponding to another background task when the number of instructions executed equals a dynamically-programmable time slice value.

Although the present invention has been described in detail, those skilled in the art should understand that they can make various changes, substitutions and alterations herein without departing from the spirit and scope of the invention in its broadest form.

What is claimed is:

1. A context controller for managing multitasking of a plurality of tasks including foreground tasks and background tasks in a processor, comprising:

a time slice instruction counter that counts a number of instructions executed with respect to a given background task; and a background task controller that cyclicly activates a context corresponding to another background task when said number equals a dynamically-programmable time slice value.

2. The context controller as recited in claim 1 wherein said time slice instruction counter initially contains said dynamically-programmable time slice value as a time slice for said given background task begins, said time slice instruction counter decrementing as said instructions with respect to said given background task are executed.

3. The context controller as recited in claim 1 wherein said context controller places said processor in an idle state when all of said background tasks are inactive.

4. The context controller as recited in claim 1 wherein said background task controller is adapted to activate a context corresponding to a particular background task by vectoring to a software-selectable memory location.

5. The context controller as recited in claim 1 further comprising a foreground task controller that activates contexts corresponding to foreground tasks based on priority and in response to events, said background task controller cyclicly activating contexts corresponding to said background tasks subject to activation of said contexts corresponding to said foreground tasks.

6. The context controller as recited in claim 1 wherein said dynamically-programmable time slice value is contained in a register of said processor.

7. The context controller as recited in claim 1 wherein application tasks executing on said processor can program said dynamically-programmable time slice value.

8. A method of managing multitasking of a plurality of tasks including foreground tasks and background tasks in a processor, comprising the steps of:

counting a number of instructions executed with respect to a given background task; and cyclicly activating a context corresponding to another background task when said number equals a dynamically-programmable time slice value.

9. The method as recited in claim 8 wherein said step of counting comprises the steps of:

initializing a time slice instruction counter with said dynamically-programmable time slice value as a time slice for said given background task begins; and decrementing said time slice instruction counter as said instructions with respect to said given background task are executed.

10. The method as recited in claim 8 further comprising the step of placing said processor in an idle state when all of said background tasks are inactive.

11. The method as recited in claim 8 wherein said step of cyclically activating comprises the step of vectoring to a software-selectable memory location.

12. The method as recited in claim 8 further comprising the step of activating contexts corresponding to foreground tasks based on priority and in response to events, said step of cyclically activating comprising the step of cyclicly activating contexts corresponding to said background tasks subject to activation of said contexts corresponding to said foreground tasks.

13. The method as recited in claim 8 further comprising the step of storing said dynamically-programmable time slice value in a register of said processor.

14. The method as recited in claim 8 further comprising the step of programing said dynamically-programmable time slice value with application tasks executing on said processor.

15. A processor, comprising:

an instruction decoder that decodes instructions received into said processor and corresponding to a plurality of tasks which includes foreground tasks and background tasks;

a plurality of register sets, corresponding to said plurality of tasks, that contain operands to be manipulated;

an execution core, coupled to said instruction decoder and said plurality of register sets, that executes instructions corresponding to an active one of said plurality of tasks to manipulate ones of said operands; and a context controller, coupled to said instruction decoder and said execution core, that manages multitasking with respect to said plurality of tasks, including:

a time slice instruction counter that counts a number of instructions executed with respect to a given background task; and a background task controller that cyclicly activates a context corresponding to another background task when said number equals a dynamically-programmable time slice value.

16. The processor as recited in claim 15 wherein said time slice instruction counter initially contains said dynamically-programmable time slice value as a time slice for said given background task begins, said time slice instruction counter decrementing as said instructions with respect to said given background task are executed.

17. The processor as recited in claim 15 wherein said context controller places said processor in an idle state when all of said background tasks are inactive.

18. The processor as recited in claim 15 wherein said background task controller is adapted to activate a context corresponding to a particular background task by vectoring to a software-selectable memory location.

19. The processor as recited in claim 15 wherein said context controller further includes a foreground task controller that activates contexts corresponding to foreground tasks based on priority and in response to events, said background task controller cyclicly activating contexts corresponding to said background tasks subject to activation of said contexts corresponding to said foreground tasks.

20. The processor as recited in claim 15 wherein said dynamically-programmable time slice value is contained in a register of said processor.

21. The processor as recited in claim 15 wherein application tasks executing on said processor can program said dynamically-programmable time slice value.

22. The processor as recited in claim 15 wherein said processor forms a portion of a general-purpose computer.

* * * * *